United States Patent [19]
Kato et al.

[11] Patent Number: 5,260,969
[45] Date of Patent: Nov. 9, 1993

[54] SPECTRUM DIFFUSION COMMUNICATION RECEIVING APPARATUS

[75] Inventors: Ichiro Kato; Toshihiko Myojo, both of Tokyo, Japan

[73] Assignee: Canon Kabushiki Kaisha, Tokyo, Japan

[21] Appl. No.: 978,161

[22] Filed: Nov. 17, 1992

Related U.S. Application Data

[63] Continuation of Ser. No. 893,556, Jun. 3, 1992, abandoned, which is a continuation of Ser. No. 436,033, Nov. 14, 1989, abandoned.

[30] Foreign Application Priority Data

Nov. 14, 1988 [JP] Japan .............................. 63-287099
Nov. 14, 1988 [JP] Japan .............................. 63-287101

[51] Int. Cl.$^5$ ............................................. H04L 27/30
[52] U.S. Cl. ............................................. 375/1; 380/34; 375/94; 375/115; 375/116
[58] Field of Search ............ 375/106, 76, 94, 113–116, 375/118–120; 380/34, 48

[56] References Cited

U.S. PATENT DOCUMENTS

| | | | |
|---|---|---|---|
| 4,538,280 | 8/1985 | Mosley, Jr. et al. | 375/1 |
| 4,583,231 | 4/1986 | Puckette | 375/1 |
| 4,630,283 | 12/1986 | Schiff | 375/1 |
| 4,639,932 | 1/1987 | Schiff | 375/1 |
| 4,641,322 | 2/1987 | Hasegawa | 375/1 |
| 4,759,034 | 7/1988 | Nagazumi | 375/1 |
| 4,875,221 | 10/1989 | Mori | 375/1 |

FOREIGN PATENT DOCUMENTS 63-98235  4/1988  Japan .

OTHER PUBLICATIONS

Proceedings of the National Electronics Conference, vol. 35, Oct. 1981, Oak Brook, Ill. US. pp. 335–339; Yao: "SAW Convolvers for Spread-Spectrum Communications".
Abstract of Japanese Patent Document 63-098235 (Apr. 28, 1988).

*Primary Examiner*—Bernarr E. Gregory
*Attorney, Agent, or Firm*—Fitzpatrick, Cella, Harper & Scinto

[57] ABSTRACT

A spectrum diffusion communication receiving apparatus includes a first generating unit for generating a reference code, a second generating unit for generating a reference signal in synchronism with the reference code, a correlating unit for obtaining a correlation between a received signal and the reference code, and a decoding for decoding the received signal in accordance with the reference signal and a correlation output from the correlating unit.

46 Claims, 19 Drawing Sheets

SPECTRUM DIFFUSION COMMUNICATION RECEIVING APPARATUS

This application is a continuation of application Ser. No. 07/893,556, filed Jun. 3, 1992, now abandoned, which is a continuation of application Ser. No. 07/436,033 filed Nov. 14, 1989, abandoned.

BACKGROUND OF THE INVENTION

1. Field of the Invention

The present invention relates to a spectrum diffusion communication receiving apparatus for receiving a signal diffused by a diffusion code.

2. Related Background Art

In a spectrum diffusion communication system using a direct diffusion method, original data such as a voice or data is converted into a base band signal having a band width much larger than that of the original data by using a diffusion code sequence such as a pseudo noise code. The base band signal is further converted into an RF (radio frequency) signal by coding schemes such as PSK (phase shift keying) and FSK (frequency shift keying). At a receiving side, reverse diffusion for obtaining a correlation with respect to a received signal is performed by using the same diffusion code as in a transmitting side, thereby converting the received signal into a narrow band signal having a band width corresponding to the original data. Subsequently, normal data decoding is performed to regenerate the original data.

In a spectrum diffusion communication receiving apparatus, the same diffusion code as in the transmitting side must be used to obtain the correlation as described above. Therefore, the diffusion code sequence included in the received signal must be synchronized with a decoding diffusion code sequence in the receiving side.

In the conventional spectrum diffusion communication receiving apparatus, code synchronization is realized by using a sliding correlation loop as shown in FIG. 20.

Referring to FIG. 20, a received diffusion signal is multiplied by a reference diffusion code sequence generated from a diffusion code generating circuit 36 in a mixer 31. An output from the mixer 31 is input to a band-pass filter (BPF) 32 having a band width corresponding to original data. An output from the BPF 32 is subjected to envelope detection by a detection circuit 33 and smoothed by a low-pass filter (LPF) 34.

When code synchronization is obtained between the diffusion code sequence included in the received signal and the reference diffusion code sequence generated from the diffusion code generating circuit 36 at the receiving side, a reverse-diffusion signal is obtained as the output from the mixer 31. Subsequently, the signal is transmitted through the BPF 32, subjected to envelope detection by the detection circuit 33, and smoothed by the LPF 34, thereby obtaining a high DC level.

When code synchronization is not obtained, no reverse-diffusion signal is obtained as the output from the mixer 31, and most of the received diffusion signal power is blocked by the BPF 32. Therefore, a DC level of a signal subjected to envelope detection and smoothed by the LPF 34 is much lower than that obtained when code synchronization is performed.

The DC level output from the LPF 34 is supplied to a voltage-controlled oscillator (VCO) 35. When code synchronization is not obtained, a DC level voltage of the output from the LPF 34 is sufficiently reduced. When the VCO receives a sufficiently low DC level voltage, it generates an output having a frequency slightly different from that of a diffusion code sequence included in the received diffusion signal. This output is supplied as a clock to the diffusion code generating circuit 36. When a clock rate of a reference diffusion code sequence generated in the diffusion code generating circuit 36 is slightly different from that of the diffusion code sequence included in the received diffusion signal, phases of the two sequences are gradually shifted from each other. As a result, code synchronization is obtained before the two phases are shifted by one period of the diffusion code sequence. A DC output voltage from the LPF 34 rises to lock the oscillation frequency of the VCO 35 at a current frequency, thereby obtaining synchronization between the received diffusion signal and the reference diffusion code sequence generated in the diffusion code generating circuit 36.

A sync determining circuit 37 normally monitors the output voltage from the LPF 34 and outputs phase information of the code of the diffusion code generating circuit 36 as a sync signal when the output voltage exceeds an arbitrary threshold level.

In the above conventional system, however, the phase of the reference diffusion code sequence must be shifted with respect to the received diffusion signal until code synchronization is obtained after a periodic operation is started. Therefore, a time required to obtain code synchronization is generally very long.

In another conventional system, three such sliding correlation loops are provided, and a diffusion code generated by a common diffusion code generating circuit is phase-shifted by an arbitrary amount to obtain phase-shifted diffusion codes (e.g., codes having a reference phase, a ½-advanced phase, and a ½-delayed phase). These phase shifted diffusion codes are input to three correlation circuits to triple a correlation detection period.

In this conventional system, however, a circuit for shifting the phase of a diffusion code is required, and three correlation circuits must be used.

In addition, since three band-pass filters and three envelope detectors are also required, a circuit arrangement and therefore adjustment are complicated.

SUMMARY OF THE INVENTION

It is an object of the present invention to improve a spectrum diffusion communication receiving apparatus.

It is another object of the present invention to increase a speed of initial synchronization of a spectrum diffusion communication receiving apparatus.

It is still another object of the present invention to provide a spectrum diffusion communication receiving apparatus for accurately detecting step-out occurred during receiving.

It is still another object of the present invention to decrease the size of a spectrum diffusion communication receiving apparatus.

The other objects of the present invention will become apparent from the following detailed description of embodiments with reference to the accompanying drawings.

DETAILED DESCRIPTION OF THE PREFERRED EMBODIMENTS

1st Embodiment

The first embodiment comprises a code generator 17 for generating a reference code, a convolver 11 for obtaining correlation between a received signal and the reference code, a peak detection circuit 13 for detecting a peak of an output from the convolver 11, and a variable delay circuit 111 for starting decoding of an information signal from the received signal when a time twice that required for the output from the convolver 11 to reach its peak after the reference code is started elapses from the start of the reference code. With this arrangement, synchronization between the received signal and the reference code can be performed at high speed.

Figure 1:
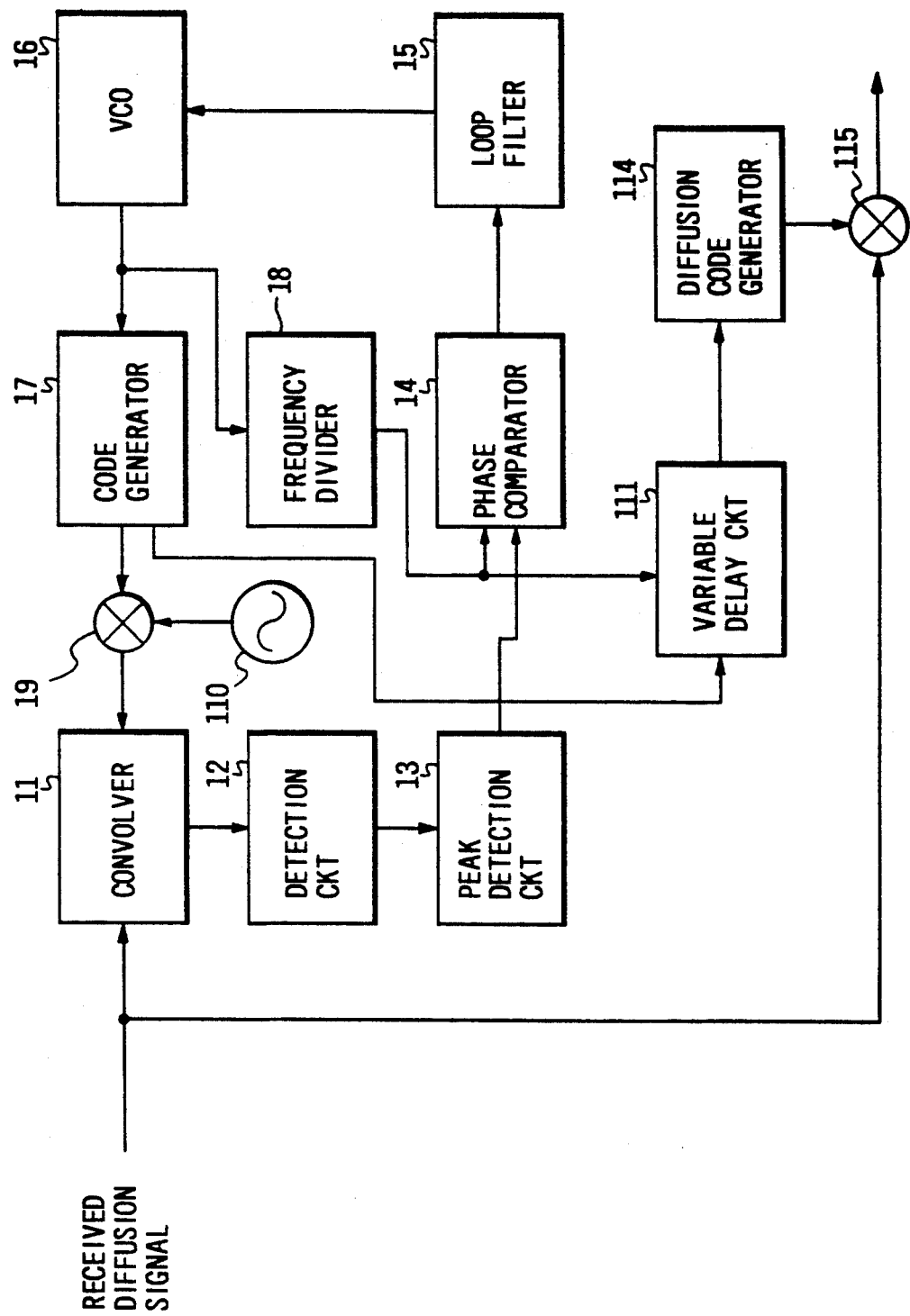
FIG. 1 is a block diagram of a receiving apparatus according to the first embodiment of the present invention.

FIG. 1 is a block diagram showing an arrangement of the first embodiment of the present invention. Referring to FIG. 1, the convolver 11 performs convolving integration, a detection circuit 12 performs envelope detection for a convolver output, the peak detection circuit 13 detects a peak position of an output voltage from the detection circuit 12, a phase comparator 14 outputs a voltage signal corresponding to a phase difference between an output signal from the peak detection circuit 13 and that from a frequency divider 18 and defined by the leading edges of the two signals, a loop filter 15 smoothes an output from the phase comparator 14, a voltage-controlled oscillator (VCO) 16 outputs a frequency corresponding to an output voltage from the loop filter, the diffusion code generator 17 generates, as a reference diffusion code sequence, a signal obtained by inverting a diffusion code included in a received diffusion signal as pseudo noise on a time base, and the frequency divider 18 frequency-divides a clock of the diffusion code to generate a code sync clock. The apparatus also comprises a mixer 19, a local oscillator 110, the variable delay circuit 111 for delaying a start point signal representing the start point of the reference diffusion code sequence output from the diffusion code generator 17 by a time twice that from the start point signal to the leading edge of the code sync clock output from the frequency divider 18, a diffusion code generator 114 for generating a decoding diffusion code sequence which is the same as the diffusion code as pseudo noise included in the received diffusion signal, and a mixer 115 for obtaining a correlation between the received signal and the decoding diffusion code.

An operation of the first embodiment will be described in detail below with reference to FIG. 1. When code synchronization is not established, the VCO 16 oscillates at a frequency close to a clock frequency of a diffusion code sequence included in a received diffusion signal from an antenna for receiving a radio signal.

Assuming that the diffusion code has n bits, the frequency divider 18 outputs one clock each time n clocks are input from the VCO 16. That is, the frequency divider 18 outputs a clock for each period of the reference code generated by the code generator 17. The peak detection circuit 13 detects a peak generated for each period of the diffusion code of the received diffusion signal and outputs a pulse. The phase comparator 14 controls the VCO 16 so that the clock synchronized with the reference code generated by the frequency divider 18 coincides with the pulse generated by the peak detection circuit 13. Therefore, even if the frequency of the reference diffusion code varies, the frequency of the reference code generated by the code generator 17 can be caused to follow the varied frequency.

That is, the frequency divider 18 generates a pulse in an arbitrary phase of the reference code generated by the code generator 17. The phase comparator 14 controls the VCO 16 so that the frequency divider 18 outputs a pulse simultaneously with the peak detection circuit 13. That is, the frequency divider 18 generates a pulse with the same period as that of the diffusion code included in the received signal. Therefore, the VCO 16 generates a pulse bit-synchronized with the diffusion code included in the received signal.

Even when bit synchronization of the reference code generated by the code generator 17 is achieved as described above, the start point of the diffusion code sequence in the received diffusion signal is still unknown.

The convolver 11 has a convolution integral area corresponding to one period or an integer multiple of one period of the diffusion code sequence. The diffusion code generator 17 outputs a code start point signal to the variable delay circuit 111 in synchronism with a timing at which one period of the reference diffusion code coincides with the integral area of the convolver 11. This state is shown in portion (a) in FIG. 2. At this time, the code start point of the diffusion code in the received diffusion signal is generally present at a random position on the convolution integral area. Since the reference diffusion code sequence is time inversion of the diffusion code sequence included in the received diffusion signal, convolving integration is a correlation operation. In this case, since the diffusion code is designed to have a low correlation value except when coincidence is obtained as autocorrelation characteristic, the output from the detection circuit 12 has a low level. This state is indicated by (a) in FIG. 3.

Subsequently, when a time elapses and the code start points of the two signals coincide with each other on the convolution integral area of the convolver as shown by the state indicated in portion (b) of FIG. 2 a high voltage level appears in the output signal from the detection circuit 12 as indicated by (b) in FIG. 3 since the autocorrelation characteristic has a sharp peak. This signal is subjected to peak detection by the peak detection circuit 13 and input to a phase lock loop constituted by the phase comparator 14, the loop filter 15, the VCO 16 and the frequency divider 18. Since the phase lock loop operates so that the leading edge of the output from the frequency divider 18 coincides with the output from the peak detection circuit 13, the leading edge of the output from the frequency divider 18 coincides with the position indicated by (b) in FIG. 3.

Figure 2:
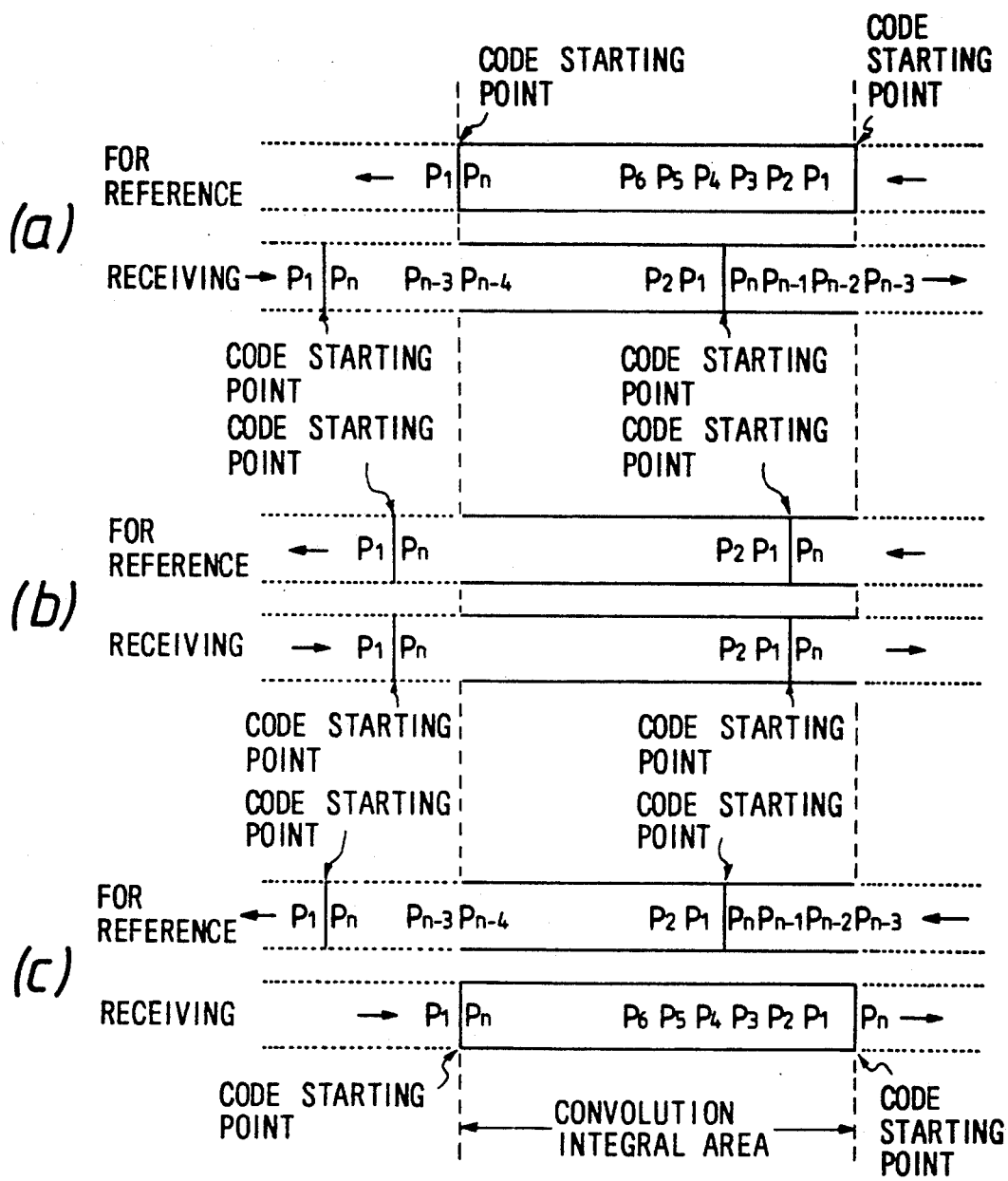
FIGS. 2 made up of parts (a)-(c), and 3 are timing charts of the first embodiment.
Figure 3:
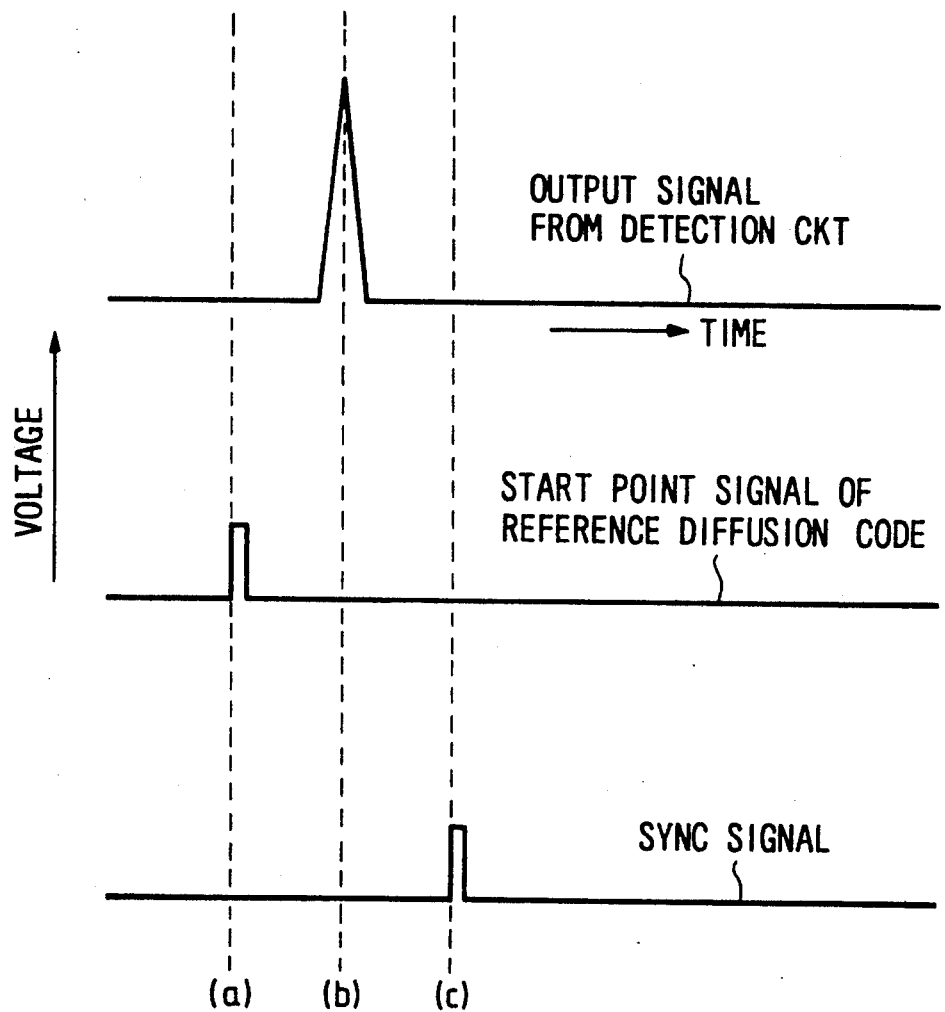

When the same time as that required for the state to transit from the state shown in portion (a) in FIG. 2 to the state shown in portion (b) in FIG. 2 elapses, a state shown in portion (c) in FIG. 2 is obtained. At this time, one period of the diffusion code sequence in the received diffusion signal coincides with the convolution integral area of the convolver 11. The variable delay circuit 111 delays the reference diffusion code sequence start point signal as the output from the diffusion code generator 17 by a time twice that from an input timing of the start point signal to the leading edge of the output from the frequency divider. Therefore, in the state shown in portion (c) of FIG. 2 the variable delay circuit 111 outputs a sync signal as indicated by (c) in FIG. 3.

The start point of the diffusion code sequence included in the received diffusion signal is known by the above sequence of operations, and code synchronization is obtained.

The sync signal output from the variable delay circuit 111 is supplied to the generator 114 for generating the same diffusion code signal as that in the received signal. The diffusion code generator 114 starts inversion diffusion in synchronism with the received diffusion signal via the mixer 115. The mixer 115 outputs a reverse-diffusion signal.

The reverse-diffusion signal is subjected to normal data decoding to regenerate the original data.

2nd Embodiment

Figure 4:
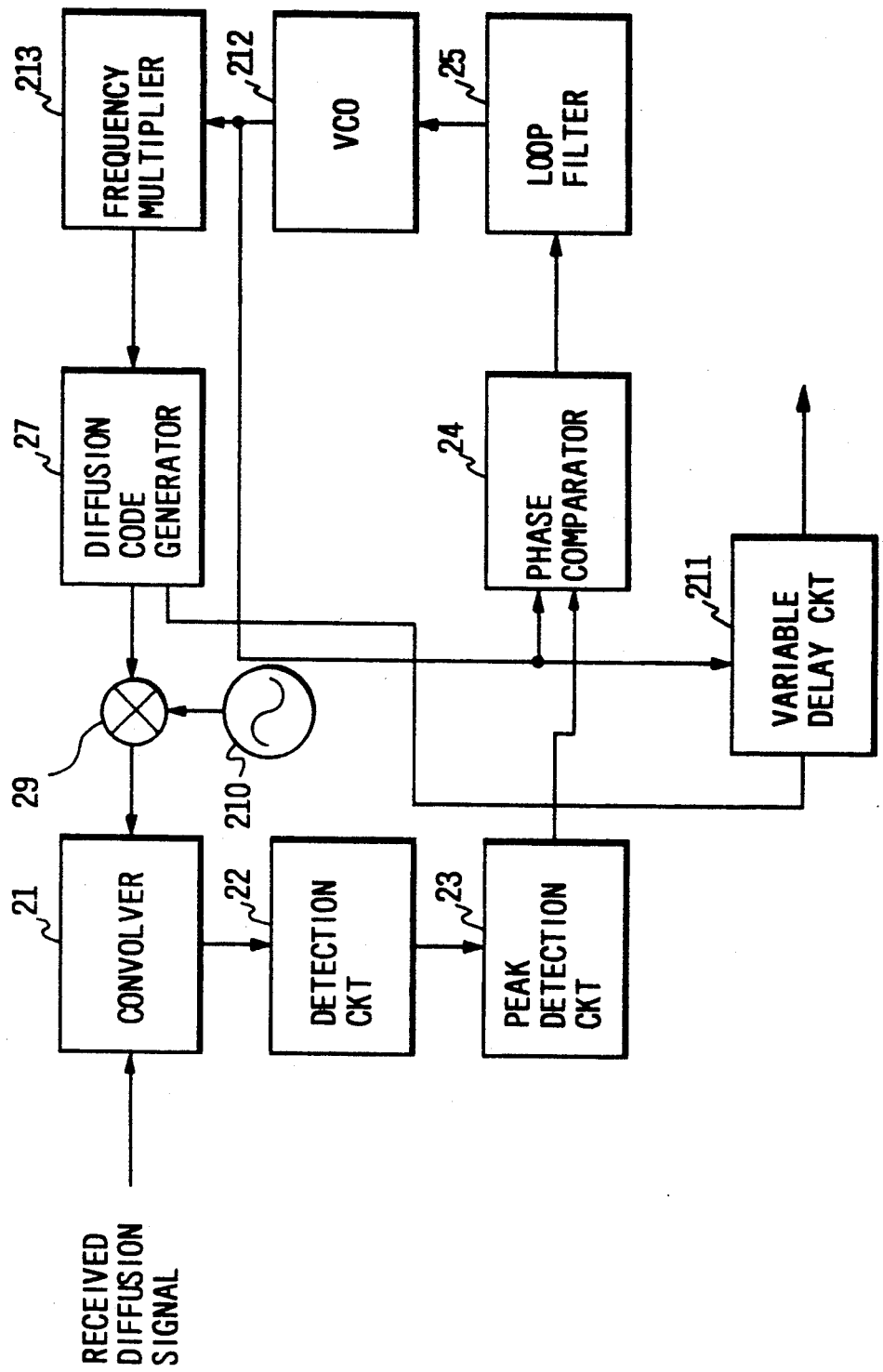
FIG. 4 is a block diagram of a receiving apparatus according to the second embodiment of the present invention.

FIG. 4 shows the second embodiment of the present invention. The second embodiment is the same as the first embodiment except for a VCO 212 and a frequency multiplier 213. Operations of other parts of the second embodiment are the same as those of the first embodiment and a detailed description thereof will be omitted.

The voltage-controlled oscillator 212 has a free-running frequency close to a code repeating frequency (reciprocal of a code period). The frequency multiplier 213 multiplies the code repeating frequency by a predetermined value and outputs a clock frequency of a diffusion code generator 27. That is, when a diffusion code has n bits, the frequency multiplier 213 multiplies the frequency of an input clock by n. Although the overall operation of the second embodiment is the same as that of the first embodiment, the oscillation frequency of the VCO of this embodiment can be suppressed lower than that of the first embodiment. Therefore, a circuit arrangement can be simplified, and power consumption can be reduced.

Synchronization can be obtained when a time twice that from the start of the reference code to the peak of the output from a convolver 21 elapses. Therefore, synchronization speed can be largely increased.

3rd Embodiment

In the third embodiment, code phase information of a received diffusion signal included in a correlation output from a convolver 11 is extracted and supplied to a phase lock loop.

Figure 5:
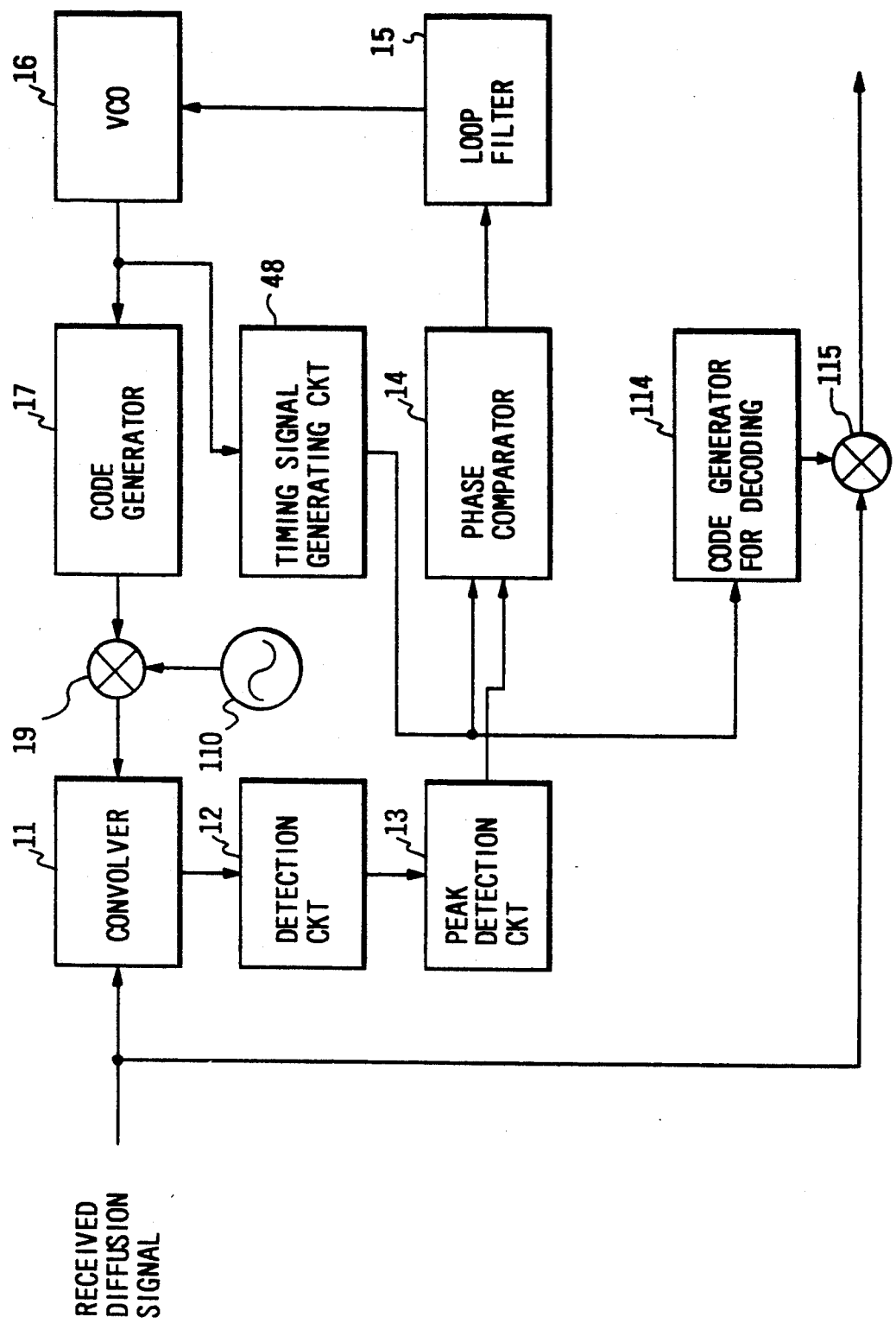
FIG. 5 is a block diagram of a receiving apparatus according to the third embodiment of present invention.

An arrangement of this embodiment is shown in FIG. 5. Referring to FIG. 5, a timing signal generating circuit 48 generates a timing signal in a specific phase of a reference code generated by a code generator 17. In FIG. 5, the same reference numerals as in FIG. 1 denote the same parts.

An operation of the third embodiment will be described below with reference to FIG. 5.

When code synchronization is not established, a VCO 16 oscillates at a frequency close to a clock frequency of a diffusion code sequence included in a received signal. The timing signal generating circuit 48 outputs a pulse at a start point of one period of a reference code sequence as an output from the code generator 17. A peak detection circuit 13 detects a peak generated for each period of a diffusion code of a received diffusion signal and outputs a pulse.

A phase comparator 14 supplies a control voltage to the VCO 16 so that the clock generated by the timing signal generating circuit 48 coincides with the clock generated by the peak detection circuit 13.

In this manner, the timing signal is synchronized with the phase of the diffusion code included in the received diffusion signal. Therefore, code synchronization can be obtained by setting the code phase of a code generator 114 for decoding by using this timing signal.

The operation will be described in more detail with reference to FIG. 6. The code generator 17 generates a reference code in synchronism with a clock generated by the VCO 16. That is, the clock generated by the VCO 16 is a clock sync pulse of the reference code. In addition, a pulse generated by the timing signal generating circuit 48 is a code sync pulse of the reference code.

Figure 6:
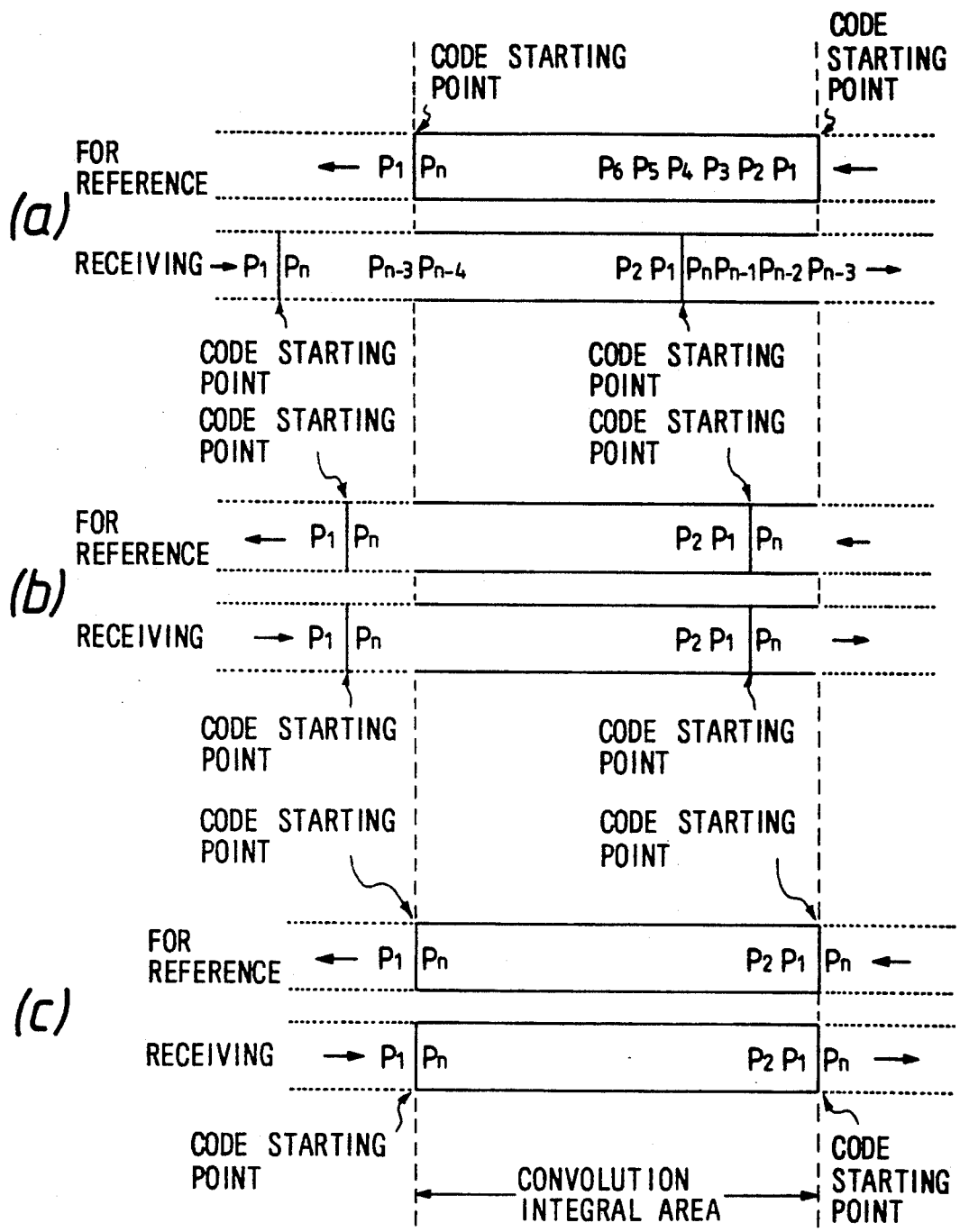
FIG. 6 made up of parts (a)-(c), is a timing chart of the third embodiment.

When no synchronization is established, the timing signal generating circuit 48 generates a pulse in synchronism with a timing at which one period of the reference code coincides with a convolution integral area of the convolver 11 as shown by the state indicated in portion (a) in FIG. 6. Similarly, when no synchronization is established, the peak detection circuit 13 generates a pulse in synchronism with a timing at which the reference code coincides with the start point of the diffusion code of the received signal on the convolution integral area of the convolver 11 as shown by the state indicated in portion (b) in FIG. 6.

When synchronization is established, one period of the reference code coincides with one period of the received signal on the convolution integral area of the convolver 11. That is, the timing signal generating circuit 48 generates a pulse at the same timing as that at which the peak detection circuit 13 generates a pulse.

Therefore, the phase comparator 14 receives the pulse generated by the peak detection circuit 13 and that generated by the timing signal generating circuit 48 and adjusts a period at which the code generator 17 generates the reference pulse so that the two pulses are generated at the same timings. The phase comparator 14 applies a control voltage to the VCO 16 for generating a clock sync pulse in order to adjust a period at which the code generator 17 generates the reference pulse. That is, the phase comparator 14 receives the pulse generated by the peak detection circuit 13 and the pulse generated by the timing signal generating circuit 48 and applies a voltage to the VCO 16 so that the timings at which the two pulses are generated coincide with each other.

By resetting the code generator 114 for decoding by using the pulse generated by the timing signal generating circuit 48, the received diffusion signal is reversely diffused to regenerate the original data.

According to the third embodiment as described above, initial synchronization can be performed at high speed.

4th Embodiment

Figure 7:
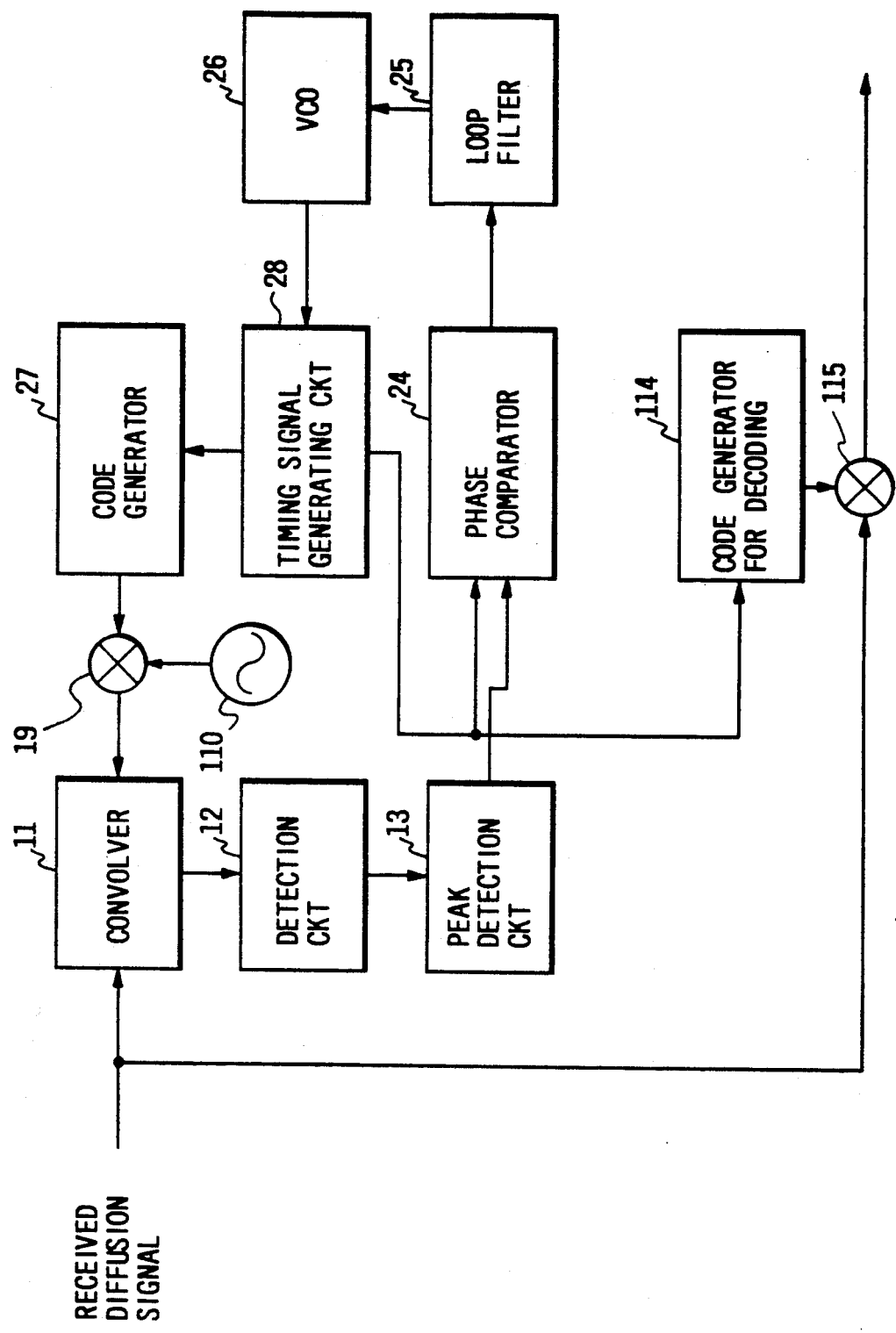
FIG. 7 is a block diagram of a receiving apparatus according to the fourth embodiment of the present invention.

The fourth embodiment of the present invention is shown in FIG. 7. In FIG. 7, the same reference numerals as in the above embodiments denote the same parts.

Referring to FIG. 7, a voltage-controlled oscillator 26 oscillates at a frequency close to a code repeating frequency of a diffusion code included in a received signal, a code generator 27 generates, as a reference code sequence, a signal obtained by inverting a diffusion code included in a received diffusion signal on a time base, and a timing signal generating circuit 28 initializes a code phase of the code generator 27 in a specific phase of a clock signal as an output from the VCO 26 and at the same time outputs a pulse to a phase comparator 24.

In the fourth embodiment, the diffusion code generator 27 is initialized by the output from the timing signal generating circuit 28, and the phase comparator 24 adjusts the oscillation frequency of the VCO 26 so that the pulse generated by a peak detection circuit 13 coincides with the pulse generated by the timing signal generating circuit 28.

In this manner, relative phase information is extracted from the reference code of the received diffusion signal included in the correlation output signal from the convolver to shift the phase of the reference code. As a result, synchronization speed can be largely increased.

In addition, in the fourth embodiment, the oscillation frequency of the VCO can be suppressed lower than that of the third embodiment.

5th Embodiment

Figure 8:
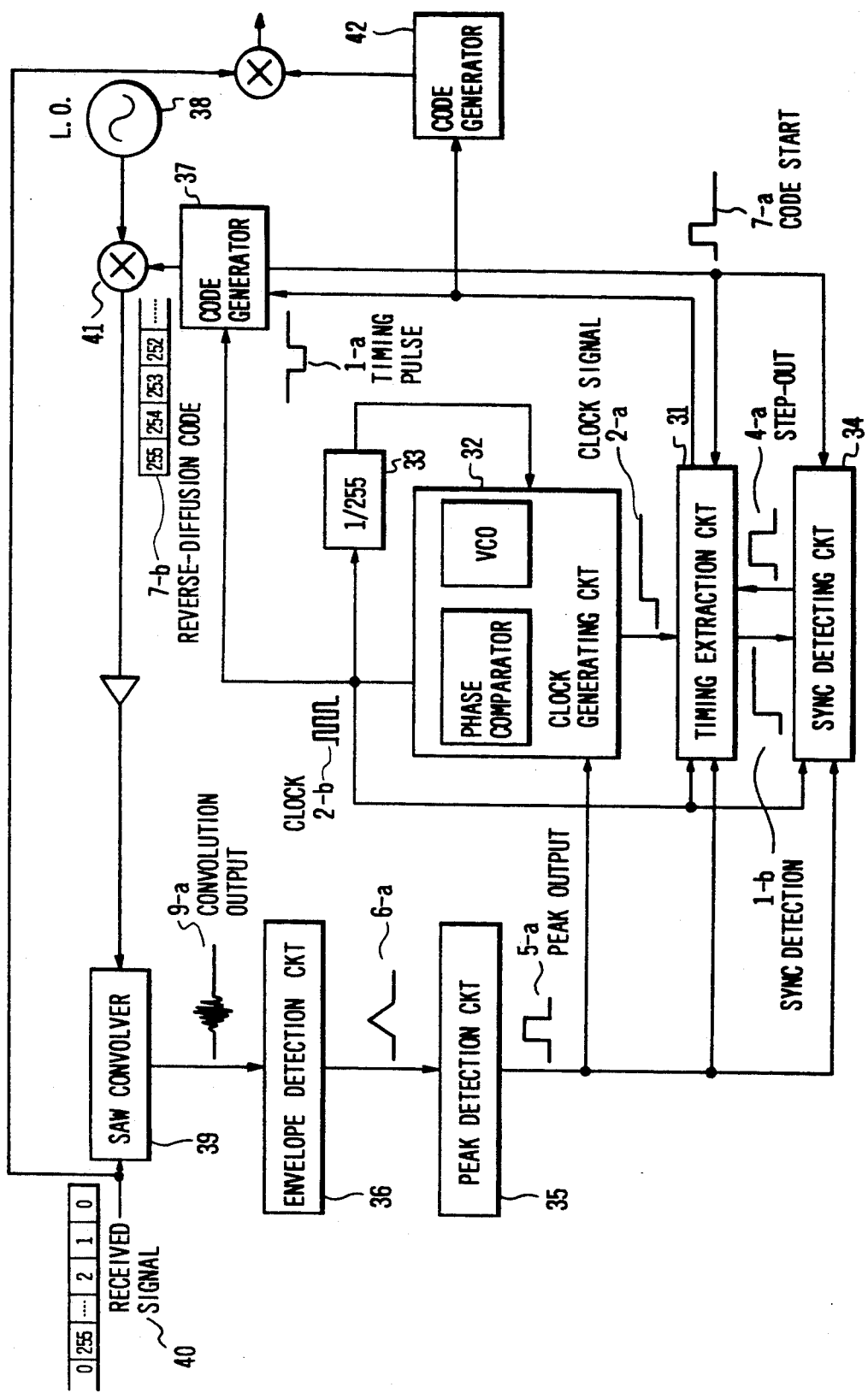
FIG. 8 is a block diagram of a receiving apparatus according to the fifth embodiment of the present invention.

FIG. 8 is a block diagram showing an arrangement of the fifth embodiment of the present invention. Referring to FIG. 8, the fifth embodiment comprises a timing extracting circuit 31; a clock regenerating circuit 32 constituted by a phase comparator and a VCO (voltage-controlled oscillator); a frequency divider 3; a sync detecting circuit 34; a peak detection circuit 35; an envelope detection circuit 36; a code generator 37 for generating a reference diffusion code, i.e., a reference code which is a pseudo noise code having a period of 255; a local oscillator 38; and an elastic surface wave convolver device (to be referred to as an SAW convolver hereinafter) 39 for obtaining correlation. A received spectrum diffusion signal (to be referred to as a received signal hereinafter) 40 is supplied from an antenna for receiving a radio signal.

Figure 9:
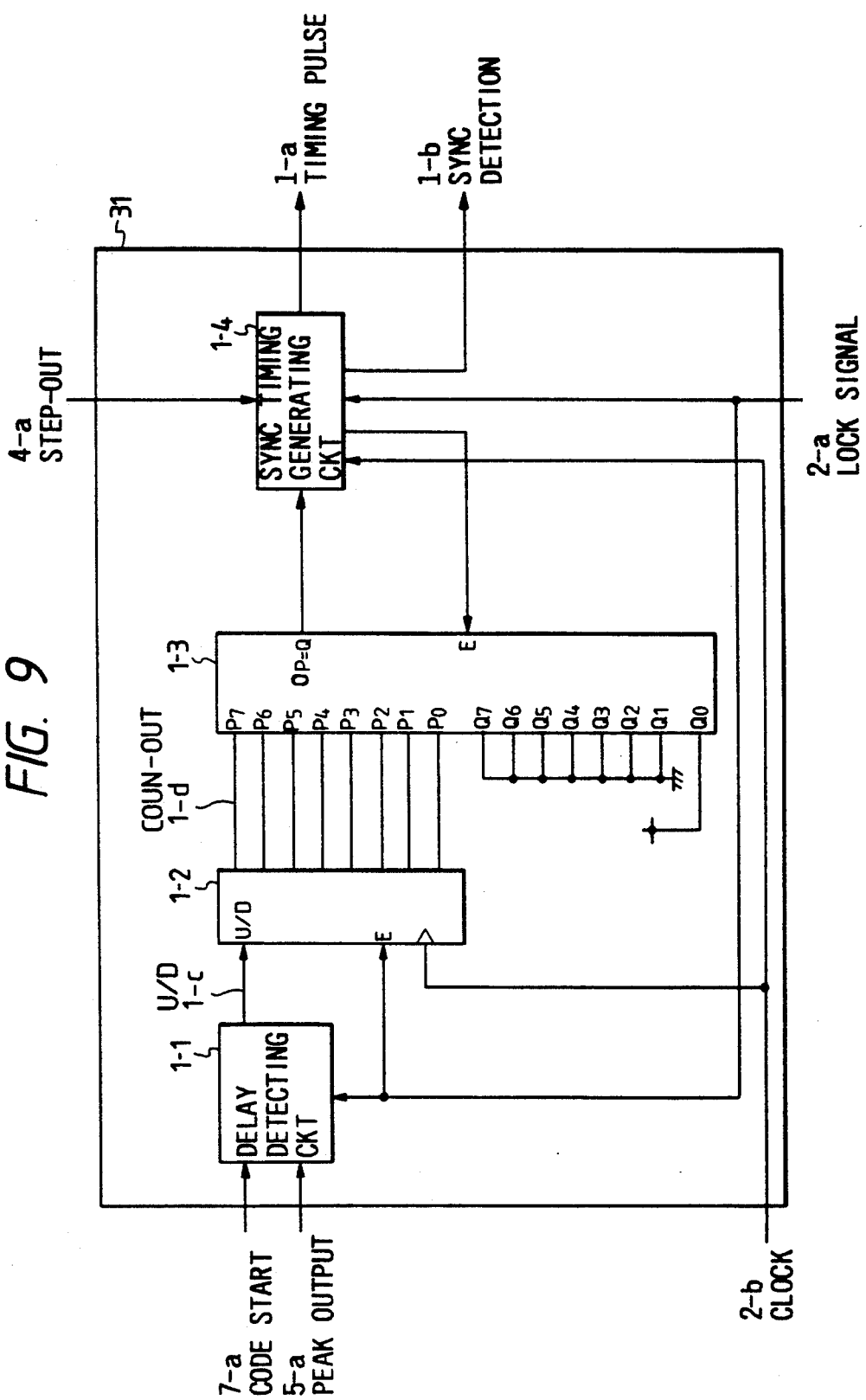
FIG. 9 is a block diagram of a timing extracting circuit of the fifth embodiment.

FIG. 9 is an internal block diagram showing an arrangement of the timing extracting circuit 31. Referring to FIG. 9, the timing extracting circuit 31 comprises a delay detecting circuit 1-1 for detecting a delay amount between a code start 7-a of the reference code and its peak output 5-a, a U/D (up/down) counter 1-2 for counting the delay amount, a comparator 1-3 for detecting the delay amount, and a sync timing generating circuit 1-4 for generating a sync timing.

Figure 10:
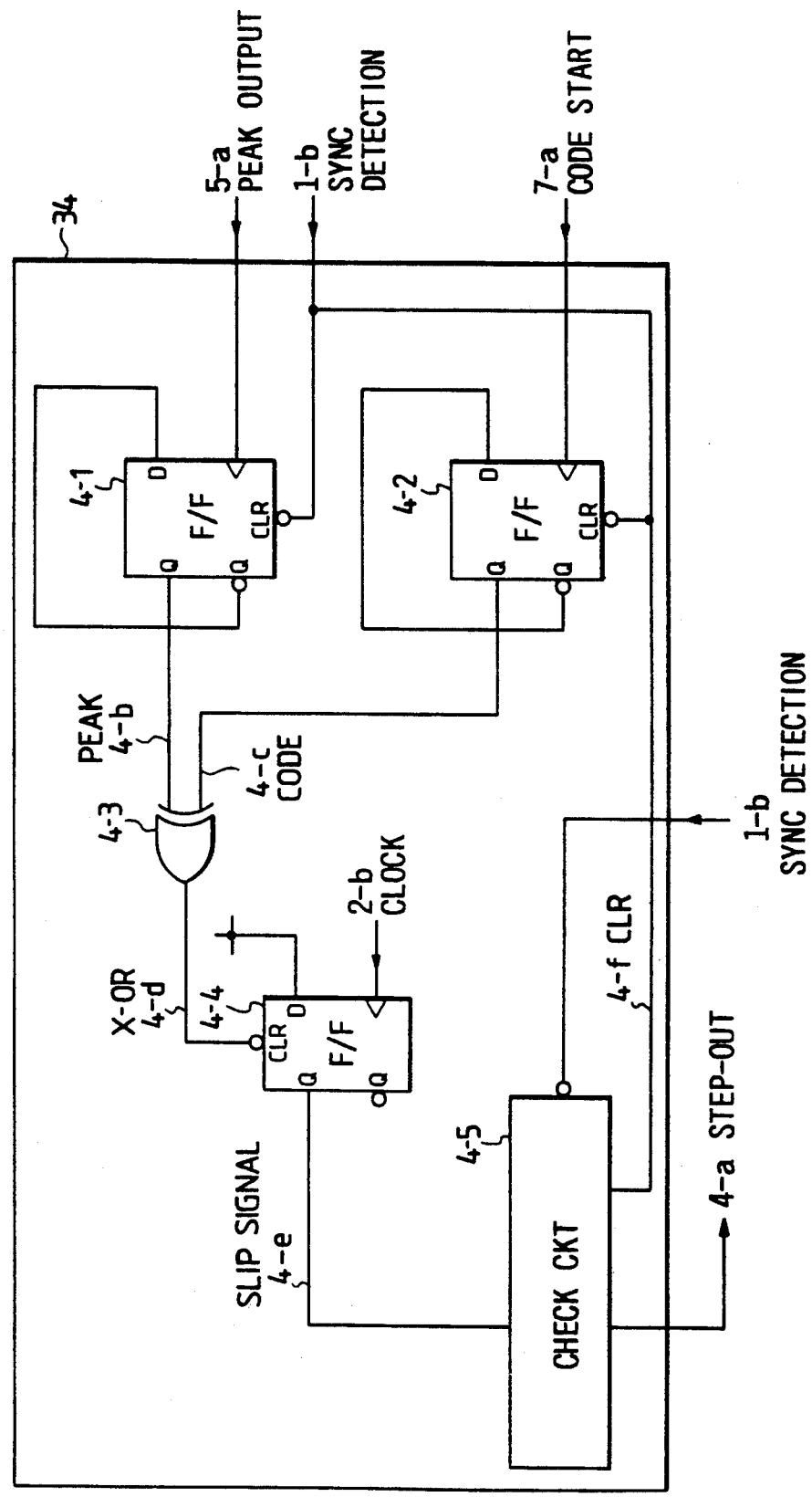
FIG. 10 is a block diagram of a sync detecting circuit of the fifth embodiment.

FIG. 10 is an internal block diagram of the sync detecting circuit 34. Referring to FIG. 10, the sync detecting circuit 34 comprises an F/F (flip-flop) 4-1 for detecting the timing of the peak output 5-a, an F/F 4-2 for detecting the timing of the code start 7-a, an exclusive OR gate 4-3, an F/F 4-4 for checking a shift, and a check circuit 4-5 for confirming a shift.

Figure 11:
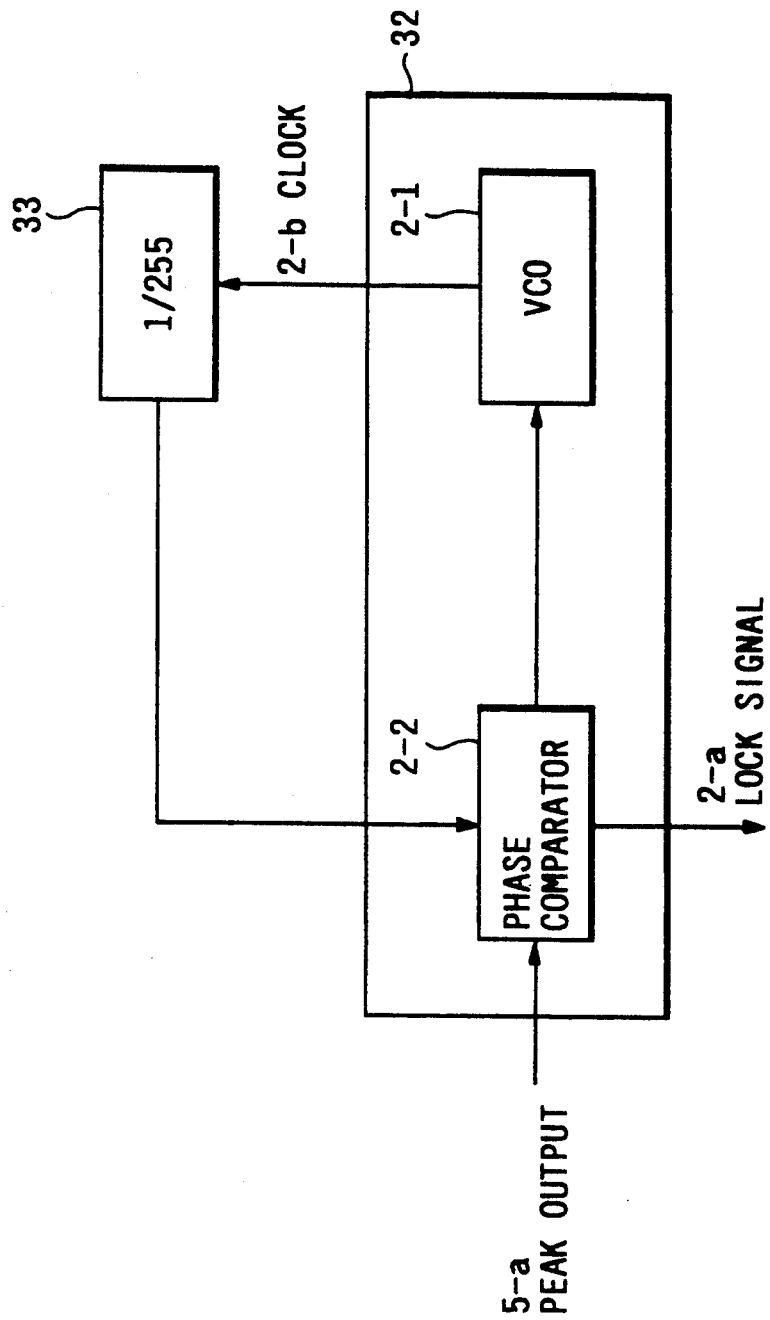
FIG. 11 is a block diagram of a clock regenerating circuit of the fifth embodiment.

FIG. 11 is an internal block diagram of the clock regenerating circuit comprising a VCO 2-1 and a phase comparator 2-2.

Figure 12:
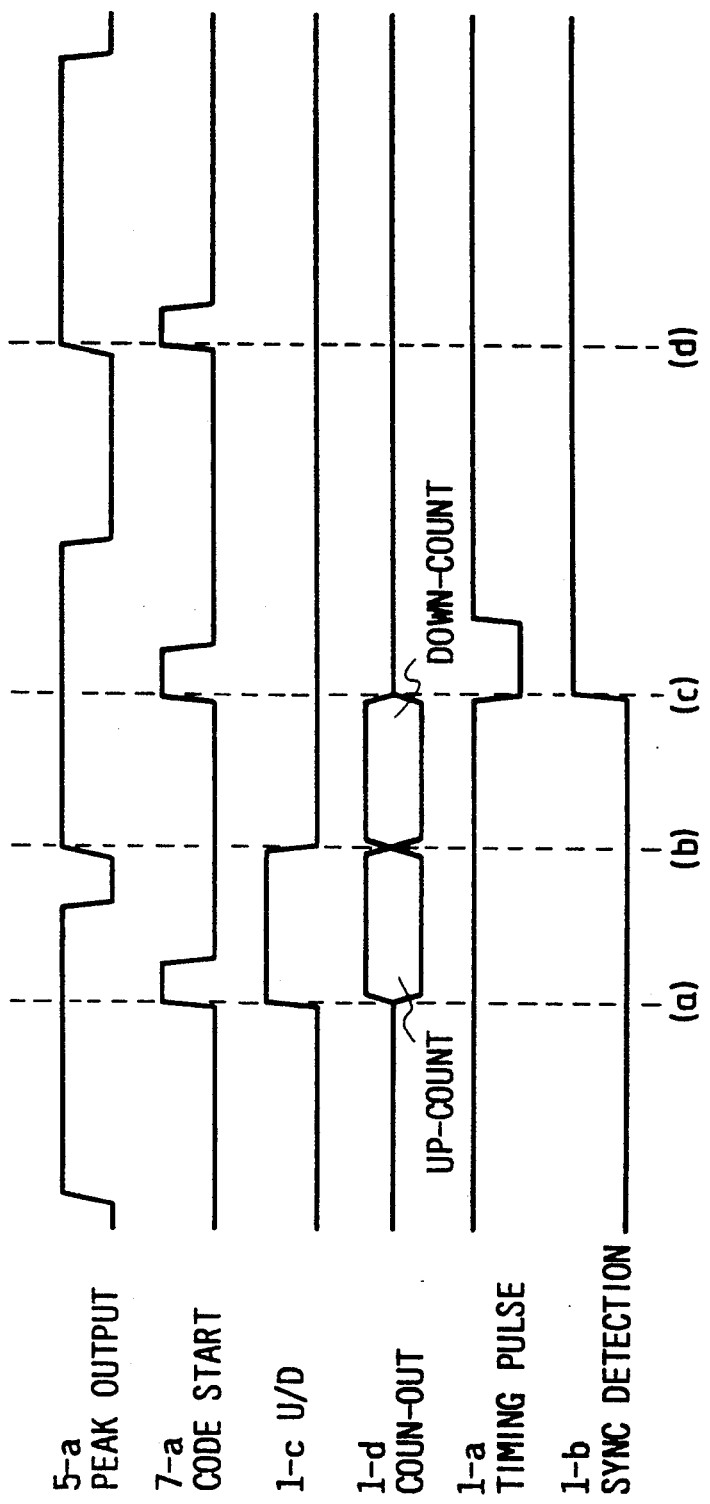
FIGS. 12 to 15, FIG. 15 being made up of parts (a)-(c) are timing charts of the fifth embodiment.
Figure 13:
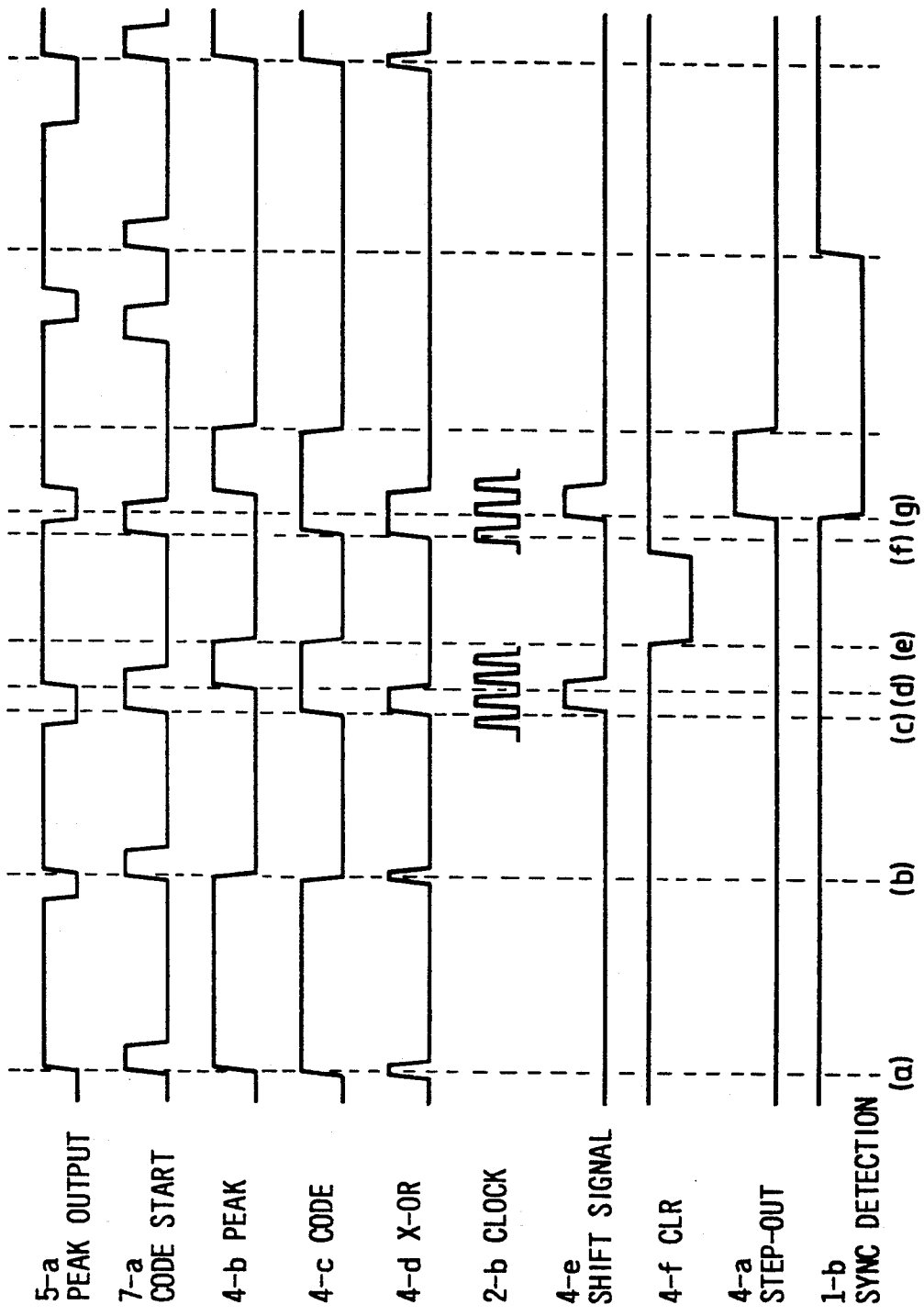
Figure 14:
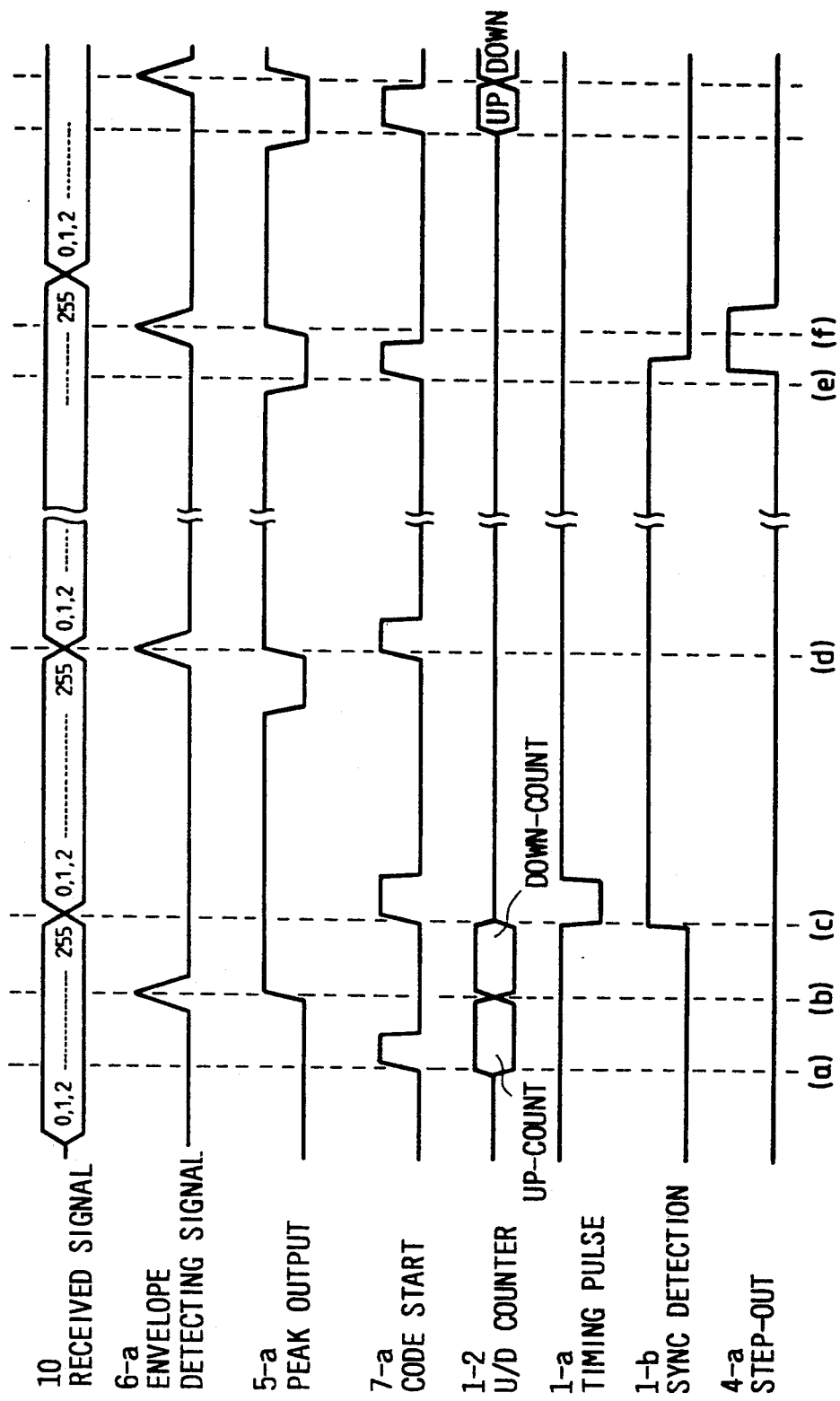

FIGS. 12 to 14 are timing charts for explaining operations of the respective circuits. Actual operations will be described below with reference to the timing charts shown in FIGS. 12 to 14.

The clock regenerating circuit 32 supplies a clock 2-b having a frequency of 16.32 MHz as a free-running frequency of the VCO 2-1 to the code generator 37, the timing extracting circuit 31, the sync detecting circuit 34, and the frequency divider 33.

In synchronism with this 16.32-MHz clock, the reference code generator 37 generates a reference pseudo noise code (to be referred to as a reference code hereinafter) 7-b for synchronization. The generated reference code 7-b is supplied to a mixer 41. A 200-MHz carrier signal output from the local oscillator 38 is coded by the reference code 7-b and supplied to the reverse-diffusion code input of the SAW convolver 39.

The received signal 40 is supplied to the received signal input of the SAW convolver 39. The received signal 40 received for the first time is a preamble (pre-procedure) for obtaining initial synchronization. A correlation of the two input signals is obtained by the SAW convolver 39 and output as a convolution output 9-a. The convolution output 9-a is subjected to full-wave rectification by the envelope detection circuit 36, and its envelope is obtained by the low-pass filter. This signal 6-a subjected to envelope detection is input to the peak detection circuit 35 to detect its peak.

At this time, the leading edge of a peak output 5-a corresponds to the position of peak. Therefore, in order to minimize influences of noise and the like, the peak output 5-a is a pulse having a long High (high-level) interval (having a large duty). The peak output pulse 5-a is input to the timing extracting circuit 31, the clock regenerating circuit 32, and the sync detecting circuit 34. These circuits operate at the leading edge of the peak output 5-a. Operations of the timing extracting circuit 31, the clock regenerating circuit 32, and the sync detecting circuit 34 which receive the peak output 5-a will be described below.

As shown in FIG. 11, the phase comparator 2-2 phase-compares a 64-kHz.clock obtained by frequency-dividing the 16.32 MHz clock 2-b oscillated by the oscillator VCO 2-1 by 255 with the peak output 5-a, converts the obtained error into a voltage, and applies the voltage to the VCO 2-1. In accordance with the voltage applied from the phase comparator 2-2, the VCO 2-1 varies the oscillation frequency so that the phases of the 1/255-frequency-divided clock 2-b and the peak output 5-a coincide with each other. In this manner, the clock regenerating circuit 32 regenerates the clock synchronized with the received signal. When the phase of the two signals coincide with each other, the phase comparator 2-2 outputs the lock signal 2-a to the timing extracting circuit 31. The timing extracting circuit 31 is enabled by this signal to start measurement of a shift width between the reverse-diffusion code 7-b and the received signal 40.

That is, the clock regenerating circuit 32 obtains bit synchronization between the received PN code and the clock 2-b generated by the VCO 2-1, and outputs the clock 2-b bit-synchronized with the received PN code.

As shown in the internal block diagram of FIG. 9, the timing extracting circuit 31 is synchronized with the 16.32-MHz clock 2-b regenerated by the clock regenerating circuit 32. When the timing extracting circuit 31 is enabled by the lock signal 2-a, it waits until the code start signal 7-a is input from the code generator 37 to the delay detecting circuit 1-1 (it is masked even if the peak output 5-a is input during waiting). When the code start signal 7-position a is input ((a) in FIGS. 12 and 14 and portion (a) of FIG. 15), the delay detecting circuit 1-1 selects up-count of the U/D counter 1-2 and causes the U/D counter 1-2 to perform up-count. The delay detecting circuit 1-1 continuously performs up-count of the U/D counter 1-2 until the next peak output 5-a is input, and measures a delay amount. When the next peak output 5-a is input (position (b) in FIGS. 12 and 14 and the state indicated in portion (b) of FIG. 15), the delay detecting circuit 1-1 switches the U/D counter 1-2 to down-count and measures a delay correction time.

An output from the U/D counter 1-2 is input to the comparator 1-3 in the next stage. When the up- and down-count values coincide with each other (position (c) in FIGS. 12 and 14 and the state shown in portion (c) of FIG. 15) a timing output signal is supplied to the sync timing generating circuit 1-4 (since the comparator 1-3 is disabled during up-count of the U/D counter 1-2, this comparison is performed only during down-count). Upon reception of the timing output signal, the sync timing generating circuit 1-4 outputs the timing pulse 1-a to the reference code generator 37 in synchronism with the 16.32-MHz clock and outputs the sync detection signal 1-b to the sync detecting circuit 34, thereby disabling the timing extracting circuit 31. Upon reception of the timing pulse 1-a, the code generator 37 and a code generator 42 output the reference code 7-b and receiving reverse-diffusion code from the beginning ((d) in FIG. 12).

The sync detecting circuit 34 is enabled upon reception of the sync detection code 1-b, and detects and monitors synchronization between the received signal 40 and the reverse-diffusion code 7-b. In the sync detecting circuit 34, when the peak output 5-a of the received signal 40 or the code start 7-a of the reference code 7-b is input to the F/F 4-1 or 4-2, an output from the F/F changes. Therefore, an output from the exclusive OR 4-3 changes from Low (low-level) to High (high-level) to enable the F/F 4-4 for checking a shift.

At this time, if the leading edge of the 16.32-MHz clock 2-b supplied from the clock regenerating circuit 32 is input, High is input to the check circuit 4-5. Upon reception of the High, the check circuit 45 outputs a CLR (clear) signal to the F/Fs 4-1 and 4-2. The check circuit 4-5 then waits until High is input from the F/F 4-4 for checking a shift as described above.

If a High signal is input again, the check circuit 4-5 determines that step-out occurs, and outputs the step-out signal 4-a to the timing extracting circuit 31, thereby ending the sync detection operation.

If the timing detection F/F 4-1 or 4-2 receives a signal to enable the F/F 4-4 for checking a shift and another signal is input before the leading edge of the 16.32 MHz clock 2-b is input, the output from the exclusive OR 4-3 changes to Low, and the F/F 4-4 for checking a shift is disabled. Therefore, the output from the F/F 4-4 is kept unchanged. This means that a shift between timings of the peak output 5-a and the code start 7-a falls within the range of one clock of the 16.32-MHz clock 2-b.

Upon reception of the step-out signal 4-a, the timing extracting circuit 31 starts the above operation and performs timing extraction again.

In the fifth embodiment as described above, when the timings of the peak output 5-a and code start 7-a are continuously shifted twice from one clock of the clock 2-b, step-out is determined.

An operation of the sync detecting circuit 34 will be described below with reference to the timing charts shown in FIG. 13.

The received signal 40 and the reference code 7-b are synchronized with each other at timings (a) and (b) in FIG. 13. That is, a shift between the peak output 5-a of the received signal 40 and the code start 7-a of the reference code 7-b falls within the range of one period of the clock 2-b. Therefore, since a High period of the exclusive OR gate output 4-d falls within the range of one period of the clock 2-b, the shift signal 4-e as an output from the F/F 4-4 for checking a shift remains unchanged at Low.

If, however, the clock 2-b appears between the code start 7-a ((c) in FIG. 13) and the peak output 5-a ((d) in FIG. 13), the F/F 4-4 for checking a shift outputs the shift signal 4-e. That is, the F/F 4-4 outputs the shift signal 4-e when the exclusive OR gate output 4-d is at High upon input of the clock 2-b. When the shift signal 4-e goes High, the check circuit 4-5 outputs a CLR signal to clear the F/Fs 4-1 and 4-2 ((e) in FIG. 13).

If the shift signal 4-e goes High again, i.e., if the clock 2-b ((g) in FIG. 13) is input within a time interval from input of the code start 7-a ((f) in FIG. 13) to input of the peak output 5-a, the check circuit 4-5 outputs the step-out signal 4-a.

When the timing extracting circuit 31 receives the step-out signal 4-a, it executes the sync detection operation again.

An operation of the circuit of this embodiment having the arrangement shown in FIG. 8 will be described below with reference to the flow chart shown in FIG. 14.

In an initial state, in order to obtain bit synchronization, the clock regenerating circuit 32 synchronizes a signal obtained by frequency-dividing the clock 2-b by 255 with the peak output signal of the convolution output. The clock 2-b is frequency-divided by 255 because the code length of the diffusion code is 256 bits and therefore the convolution output 9-a of the convolver 9 has a peak every 256 bits.

In addition, in order to obtain code synchronization, the timing extracting circuit 31 counts the clock 2-b from input of the code start signal generated by the code generator 37 for the reference code ((a) in FIG. 14) to input of the peak output 5-a from the peak detection circuit 35 ((b) in FIG. 14). When the timing extracting circuit 31 counts the number of clocks 2-b corresponding to the count from input of the peak output 5-a ((b) in FIG. 14), it outputs the timing pulse 1-a to the code generator 37 for a reference code. When the code generator 37 receives the timing pulse 1-*a*, it outputs the reference code from the beginning ((c) in FIG. 14).

Figure 15:
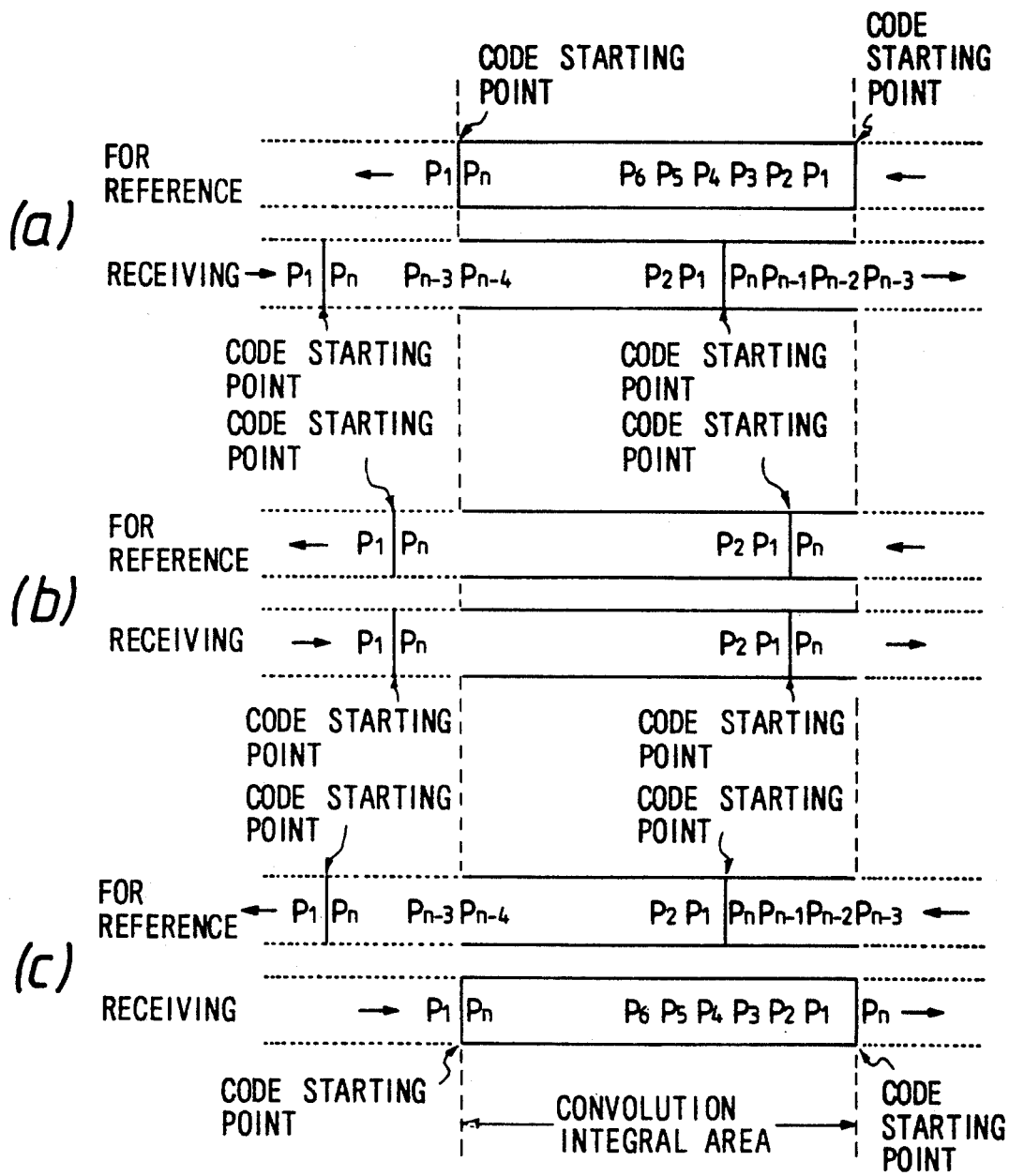

That is, when the code generator 37 starts outputting the reference code (the state shown in portion (a) of FIG. 15), it outputs the code start signal 7-*a* to the timing extracting circuit 31. The peak detection circuit 35 generates the peak output signal 5-*a* of the convolution output when the received signal and the reference signal coincide with each other as shown by the state indicated in portion (b) in FIG. 15. As shown in FIG. 15, when the same time as a time difference between input of the code start signal 7-*a* and input of the peak output signal 5-*a* elapses after input of the peak output signal 5-*a*, the diffusion code of the received signal coincides with the convolution integral area of the convolver 39. Therefore, the timing extracting circuit 31 outputs the code start signal 7-*a* ((c) in FIG. 14) so that the code generator 37 starts outputting the reference code 7-*b*.

After the received signal 40 is synchronized with the reference code 7-*b* as described above, the sync detecting circuit 34 performs step-out detection. Note that the code start signal 7-*a* is also supplied to the code generator 42 for decoding an information signal from the received signal. The code generator 42 generates a reverse-diffusion code common to the diffusion code in the received signal and starts outputting the reverse-diffusion code when it receives the code start signal 7-*a*.

The sync detecting circuit 34 compares and measures a time difference between the peak output signal 5-*a* of the convolution output from the peak detection circuit 35 and the code start signal 7-*a* of the code generator 37 with the clock 2-*b*. When the sync detecting circuit 34 determines that a shift is produced between the code start signal 7-*a* ((e) in FIG. 14) and the peak output 5-*a* ((f) in FIG. 14), it outputs the step-out signal 4-*a* to the timing extracting circuit 31.

Upon reception of the step-out signal 4-*a*, the timing extracting circuit 31 obtains code synchronization and causes the code generator 42 to output a reverse-diffusion code synchronized with the received signal.

In this case, the sync detecting circuit 34 can determine step-out if only a shift is produced once between the peak output 5-*a* and the code start signal 7-*a*. In this embodiment, however, step-out can be determined when a shift is produced twice. In this manner, an influence of noise can be reduced.

6th Embodiment

Figure 16:
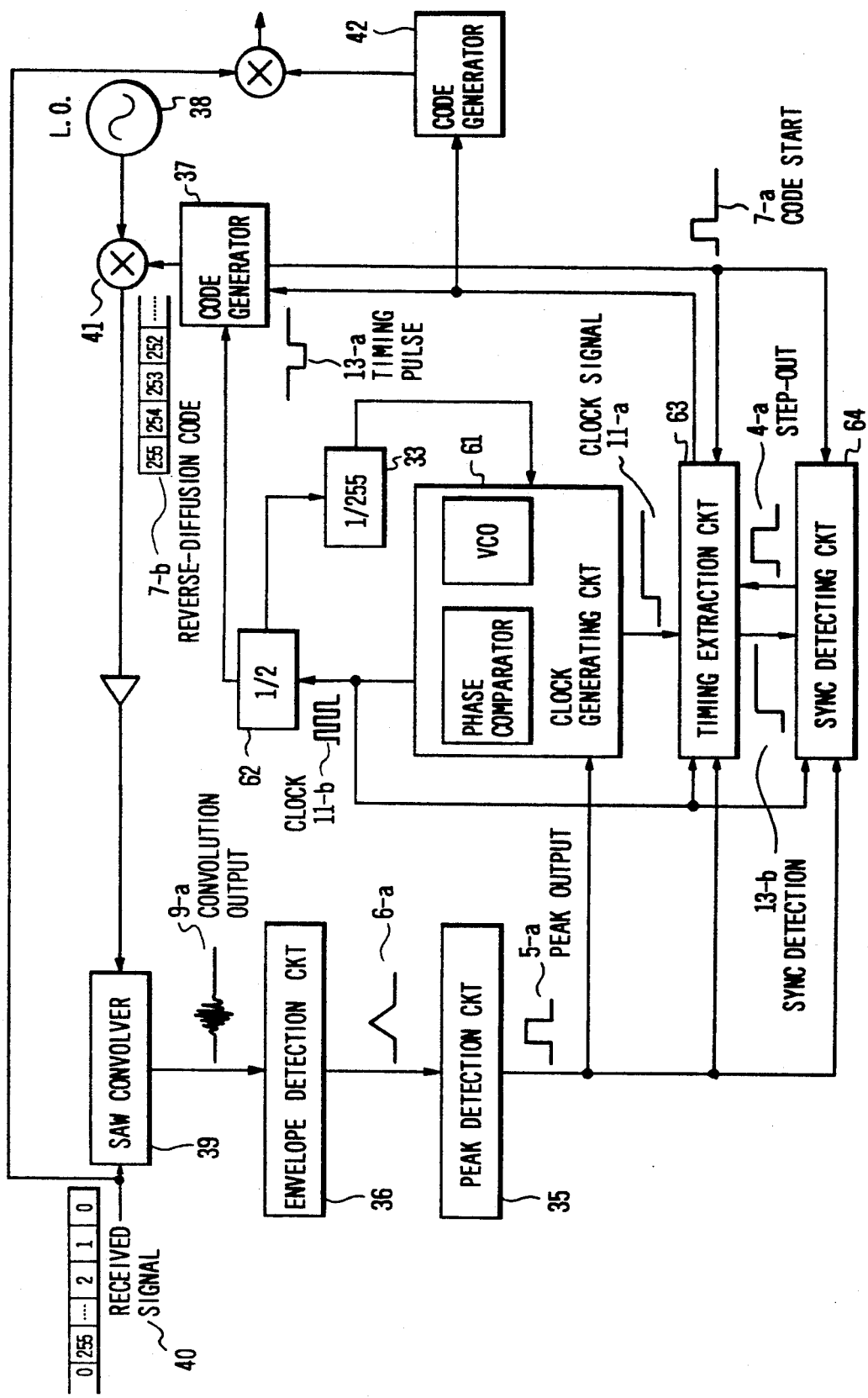
FIG. 16 is a block diagram of a receiving apparatus according to the sixth embodiment of the present invention.

The sixth embodiment of the present invention is shown in FIGS. 16 to 19. In these drawings, the same reference numerals as in the fifth embodiment denote the same parts. Referring to FIG. 16, the sixth embodiment comprises a timing extracting circuit 63, a clock regenerating circuit 61 constituted by a phase comparator and a VCO (voltage-controlled oscillator), a frequency divider 33, a sync detecting circuit 64, a peak detection circuit 35, an envelope, detection circuit 36, a diffusion code generator 37 for generating a reference PN code having a period of 255, a local oscillator 38, an SAW convolver 39 for obtaining a correlation, a received signal 40, and a frequency divider 62 for forming a reference clock for causing the diffusion code generator 37 to generate a diffusion code 7-*b* from a 32.64-MHz clock 11-*b*.

Figure 17:
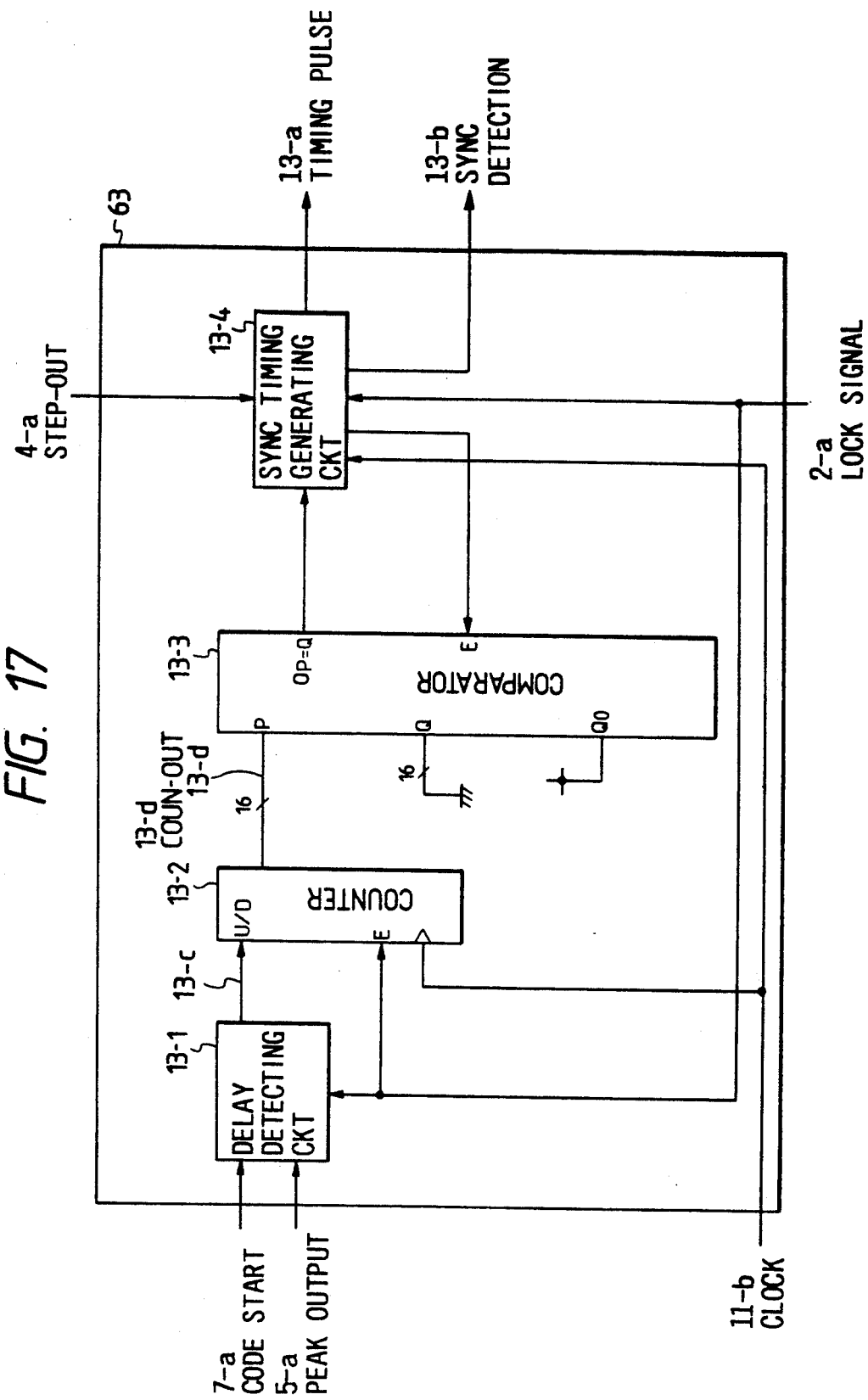
FIG. 17 is a block diagram of a timing extracting circuit of the sixth embodiment.

FIG. 17 is an internal block diagram of the timing extracting circuit 63 having the following arrangement. That is, the timing extracting circuit 63 comprises a delay detecting circuit 13-1, for detecting a delay amount between the reverse-diffusion code 7-*b* and a peak output 5-*a*, a U/D (up/down) counter 13-2 for measuring the delay amount, a comparator 13-3 for detecting the delay amount, and a sync timing generating circuit 13-4 for obtaining a synchronization timing.

Figure 18:
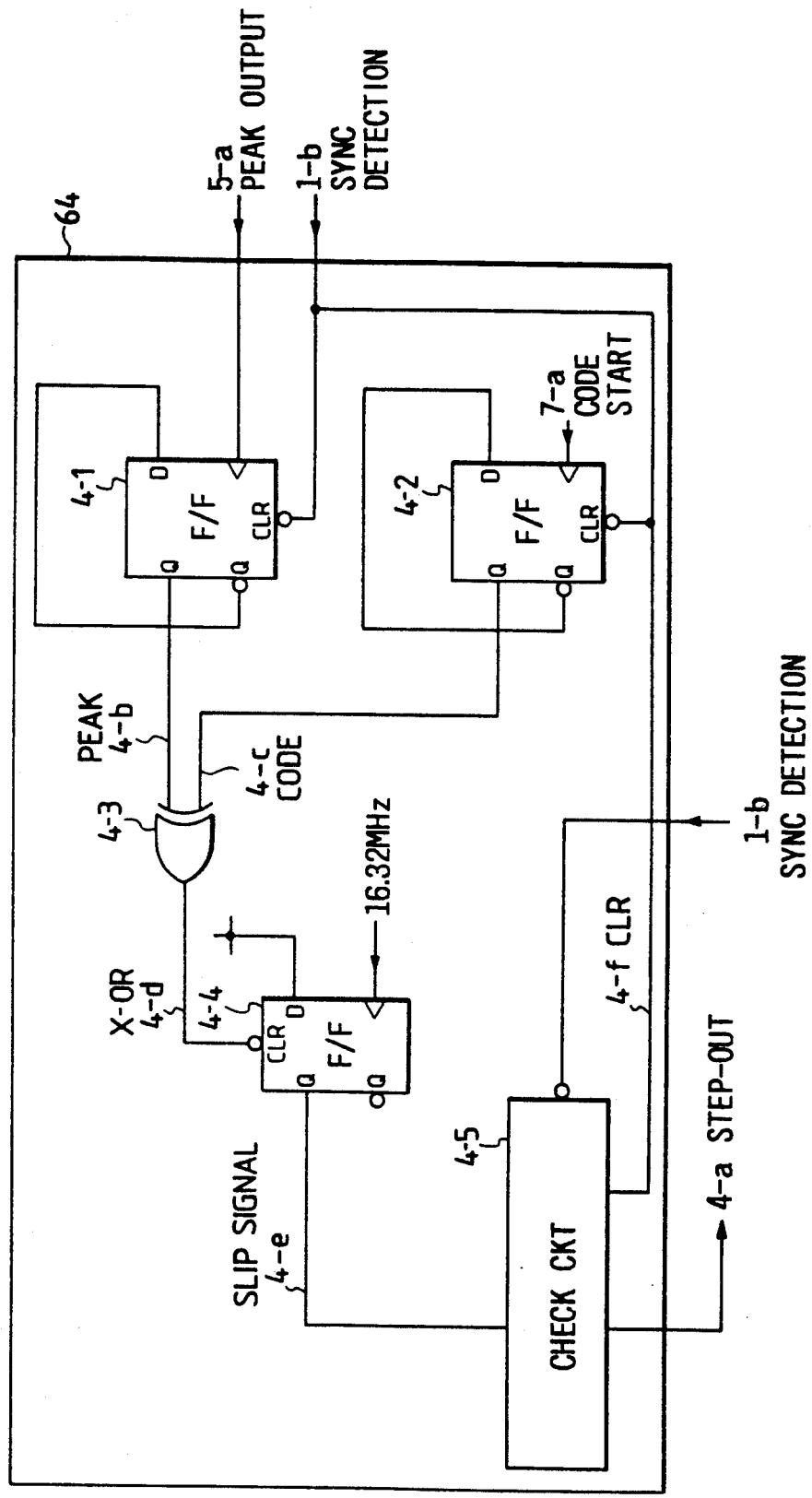
FIG. 18 is a block diagram of a sync detecting circuit of the sixth embodiment.

FIG. 18 is an internal block diagram of the sync detecting circuit 64. As shown in FIG. 18, the sync detecting circuit 64 comprises an F/F (flip-flop) 4-1 for detecting the timing of the peak output 5-*a*, an F/F 4-2 for detecting the timing of a code start 7-*a*, an exclusive OR gate 4-3, an F/F 4-4 for checking a shift, and a check circuit 4-5 for confirming a shift. An actual operation of this arrangement will be described below.

The clock regenerating circuit 61 supplies a clock 11-*b* having a frequency of 32.64 MHz which is a free-running frequency of the VCO 11-1 to the frequency divider 62, the timing extracting circuit 63, and the sync detecting circuit 64. In synchronism with a 32.64-MHz clock output from the frequency divider 62, the diffusion code generator 37 generates the reference PN code (to be referred to as a reference code hereinafter) 7-*b* for synchronization. The reference code 7-*b* is supplied to a mixer 41. A 200-MHz carrier signal output from the local oscillator 38 is coded by the reverse-diffusion code 7-*b* and supplied to the reverse-diffusion code input of the SAW convolver 39. The received signal 40 is supplied to the received signal input of the SAW convolver 39. The received signal 40 received for the first time is a preamble (preprocedure) for obtaining initial synchronization. A correlation of the two input signals is obtained by the SAW convolver 39 and output as a convolution output 9-*a*. The convolution output 9-*a* is subjected to full-wave rectification by the envelope detection circuit 36, and its envelope is obtained by a low-pass filter. A signal 6-*a* subjected to envelope detection is input to the peak detection circuit 35, and its peak is detected.

The leading edge of a peak output 5-*a* corresponds to the position of its peak. Therefore, in order to minimize influences of, e.g., noise, the peak output 5*a* is a pulse having a long High (high-level) interval (having a large duty). The peak output pulse 5-*a* is input to the timing extracting circuit 63, the clock regenerating circuit 61, and the sync detecting circuit 64. These circuits operate in accordance with the leading edge of the peak output 5-*a*. Operations of the timing extracting circuit 63, the clock regenerating circuit 61, and the sync detecting circuit 64 which receive the peak output 5-*a* will be described below.

Figure 19:
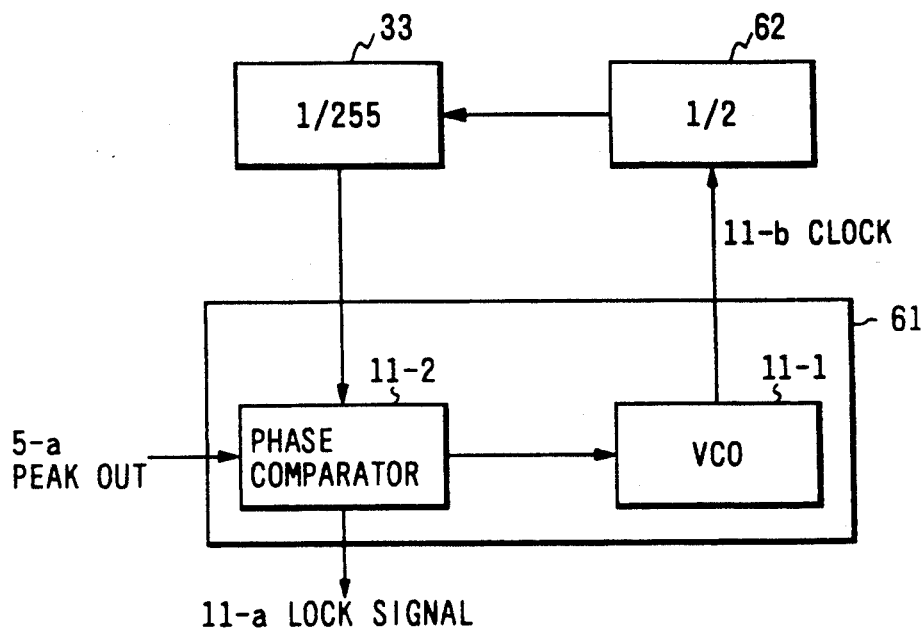
FIG. 19 is a block diagram of a clock regenerating circuit of the sixth embodiment.
Figure 20:
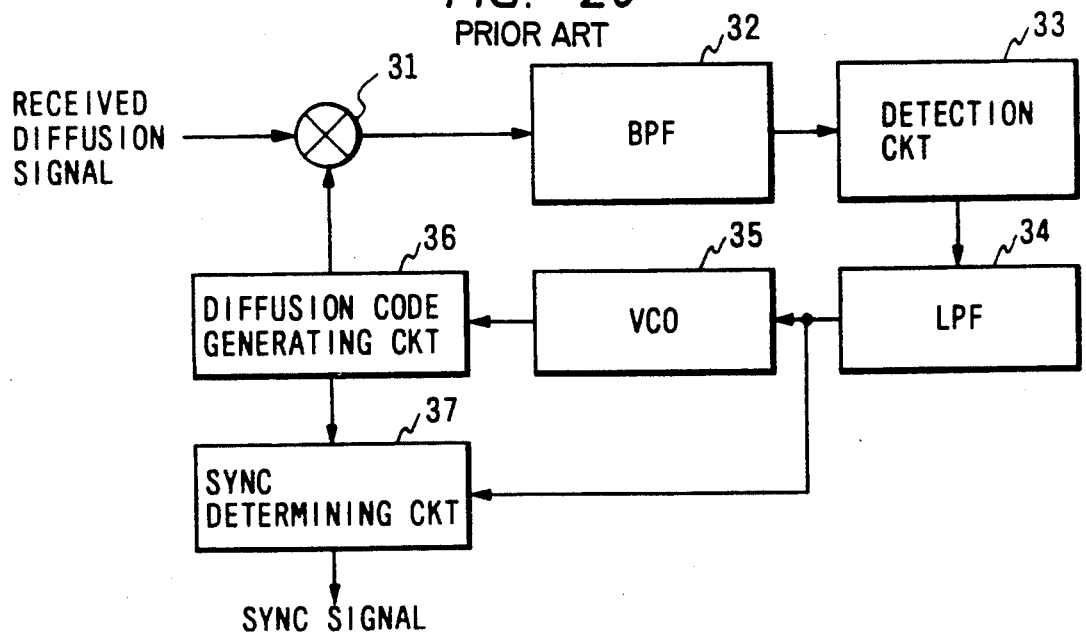
FIG. 20 is a block diagram of a conventional code synchronizing circuit.

As shown in FIG. 19, the frequency divider 62 frequency-divides the 32.64-MHz clock 11-*b* oscillated by a VCO 11-1 of the clock regenerating circuit 61 by 2. The frequency divider 33 frequency-divides a clock output from the frequency divider 62 by 255 and outputs a 64-kHz clock. A phase comparator 11-2 phase-compares the 64-kHz clock output from the frequency divider 33 with the peak output 5-*a*, converts an error into a voltage, and supplies the voltage to the VCO 11-1, thereby regenerating a clock bit-synchronized with a diffusion code included in the received signal.

When the phases of the clock output from the frequency divider 33 and the peak output 5-*a* coincide with each other, the clock regenerating circuit 61 outputs a lock signal 11-*a* to the timing extracting circuit 63. The timing extracting circuit 63 is enabled by this signal and starts measurement of a shift width between the reverse-diffusion code 7-*b* and the received signal 40.

As shown in the internal block diagram of FIG. 17, the timing extracting circuit 63 is synchronized with the 32.64-MHz clock regenerated by the clock regenerating circuit 61. When the timing extracting circuit 63 is enabled, it waits until the code start signal 7-a is input to the delay detecting circuit 13-1 (it is masked even if the peak output 5-a is input during waiting). When the code start signal 7-a is input, the delay detecting circuit 13-1 selects up-count of the U/D counter 13-2 and causes the U/D counter 13-2 to perform up-count. The delay detecting circuit 13-1 continues up-count until the next peak output 5-a is input, and measures its delay amount. When the next peak output 5-a is input, the delay detecting circuit 13-1 switches the U/D counter 13-2 to down-count and measures a delay correction time.

An output from the U/D counter is input to the comparator 13-3 in the next stage. When the up- and down-count values coincide with each other, a timing output signal is supplied to the sync timing generating circuit 13-4 (since the comparator 13-3 is disabled when the U/D counter 13-2 performs up-count, this comparison is performed only during down-count). Upon reception of the timing output signal, the sync timing generating circuit 13-4 outputs a timing pulse 13-a to the reference code generator 37 in synchronism with the 32.64-MHz clock 11-b, and outputs the sync detection signal 13-b to the sync detecting circuit 64, thereby disabling the timing extracting circuit 63. Upon reception of the timing pulse 13-a, the code generator 37 and a code generator 42 output the reference code 7-b and a reverse-diffusion code for receiving from the beginning.

The sync detecting circuit 64 is enabled by the sync detection signal 13-b and detects and monitors synchronization between the received signal 40 and the reverse-diffusion code 7-b. In the sync detecting circuit 64, when the received signal 40 or the reference code 7-b is input to the F/F 4-1 or 4-2, an output from the F/F changes. As a result, an output from the exclusive OR 4-3 changes from Low (low-level) to High (high-level) to enable the F/F 4-4 for checking a shift.

At this time, if the leading edge of the 32.64-MHz clock supplied from the clock regenerating circuit 61 is input, High is input to the check circuit 4-5. Upon reception of this signal, the check circuit 4-5 outputs a CLR signal to the F/Fs 4-1 and 4-2. The check circuit 4-5 then waits until High is input from the shift check F/F as described above.

When High is input again, the check circuit 4-5 determines that step-out occurs, and outputs a step-out signal 4-a to the timing extracting circuit 63, thereby ending the sync detection operation.

When the timing detection F/F 4-1 or 4-2 receives the signal to enable the shift check F/F 4-4 and another signal is input before the leading edge of the 32.64-MHz clock 11-b is input, the output from the exclusive OR 4-3 goes Low, and the output from the check F/F remains unchanged because the F/F is disabled. This means that a timing shift between the 1 peak output 5-a and the code start 7-a falls within the range of one clock of the 32.64-MHz clock.

Upon reception of the step-out signal 4-a, the timing extracting circuit 63 starts the operation as described above after a predetermined time interval, thereby extracting a timing again.

In this embodiment as described above, since a 32.64-MHz clock is used as the clock 11-b, synchronization can be obtained more accurately.

In addition, accuracy of synchronization can be further improved by converting the clock generated by the VCO 11-1 into 16.32 MHz by the frequency divider 62 by using a free-running frequency which is an integer multiple of 16.32 MHz as a frequency of a diffusion code as a free-running frequency of the VCO.

Furthermore, a microprocessor (e.g., one-chip microcomputer) can be used as the timing extracting circuit.

According to the sixth embodiment as described above, synchronization can be detected and maintained. Therefore, analog circuits such as a band-pass filter and a phase shift circuit for constituting a DLL (delay lock loop) can be omitted. As a result, parts cost can be reduced, parts can be decreased in size, and adjustment of the circuit can be simplified.

As described above, according to this embodiment, synchronization with respect to a received signal can be obtained at high speed.

In addition, step-out with respect to the received signal can be accurately detected.

The present invention has been described above on the basis of the preferred embodiments. The present invention, however, can be variously modified and applied without departing from the spirit and scope of the appended claims.

What is claimed is:

1. A spectrum diffusion communication receiving apparatus comprising:
   first generating means for generating a reference code;
   first correlating means for obtaining a correlation between a received signal and the reference code;
   second generating means for generating a decoding code in accordance with the a correlation output from said first correlating means;
   second correlating means for obtaining a correlation between the received signal and the decoding code; and
   adjusting means for adjusting a code start of the reference code in accordance with the correlation output from said first correlating means.

2. An apparatus according to claim 1, wherein said adjusting means comprises
   control means for controlling the generation of the reference code in accordance with the reference code and the correlation output from said first correlating means.

3. An apparatus according to claim 2, wherein said control means controls the generation of the reference code in accordance with a phase difference between the reference code and the correlation output from said first correlating means.

4. An apparatus according to claim 3, wherein said control means comprises;
   third generating means for generating a signal corresponding to the phase difference between the reference code and the correlation output from said first correlating means; and
   oscillating means for supplying a clock having a frequency corresponding to the signal generated by said third generating means to said adjusting means.

5. An apparatus according to claim 4, wherein said first generating means generates a reference signal by frequency-dividing the clock generated by said oscillating means.

6. An apparatus according to claim 2, wherein the reference code is obtained by inverting the decoding code on a time axis.

7. An apparatus according to claim 1, wherein the reference code is a time inversion of the decoding code.

8. An apparatus according to claim 1, wherein said first generating means generates a reference signal for every period of the reference code.

9. An apparatus according to claim 1, wherein said correlating means is a convolver.

10. An apparatus according to claim 9, wherein a convolution time of said convolver is one period of the reference code or an integer multiple thereof.

11. An apparatus according to claim 1, wherein said adjusting means adjusts the code start of the reference code so that the code start coincides with the correlation output.

12. A spectrum diffusion communication receiving apparatus comprising:
generating means for generating a reference code;
correlating means for obtaining a correlation between a received signal and the reference code;
decoding means for decoding the received signal in accordance with a correlation output from said correlating means; and
adjusting means for adjusting a code start of the reference code in accordance with the correlation output from said correlating means.

13. An apparatus according to claim 12, wherein said decoding means comprises:
second generating means for generating a decoding code; and
second correlating means for obtaining a correlation between the received signal and the decoding code.

14. An apparatus according to claim 13, wherein said decoding means resets said second generating means when the phase difference between the reference code generated by said generating means and the correlation output from said correlating means becomes not less than a predetermined value.

15. An apparatus according to claim 13, wherein the reference code is a time inversion of the decoding code.

16. An apparatus according to claim 13, wherein said decoding means resets said second generating means in accordance with the phase difference between the correlation output from said correlating means and code start of the decoding code.

17. An apparatus according to claim 12, wherein said control means controls and decoding means in accordance with a phase difference between the sync signal generated by said generating means and the correlation output from said correlating means.

18. An apparatus according to claim 12, wherein said correlating means is a convolver.

19. An apparatus according to claim 18, wherein a convolution time of said convolver is one period of the reference code or an integer multiple thereof.

20. An apparatus according to claim 12, wherein said decoding means counts a time interval from the reference signal until the occurrence of the correlation output from said correlating means, and when, the counted time interval elapses from an occurrence of the correlation output from said correlating means, said decoding means is set to start decoding.

21. An apparatus according to claim 12, wherein said adjusting means includes second generating means for generating a synchronizing signal indicating the code start of the reference code, and adjusts the code start of the reference code so that a phase difference between the synchronizing signal and the correlation output is removed.

22. An apparatus according to claim 12, wherein said adjusting means adjusts the code start of the reference code so that the code start coincides with the correlation output.

23. A spectrum diffusion communication receiving apparatus comprising:
first generating means for generating a reference code;
first correlating means for obtaining a correlation between a received signal and the reference code;
second generating means for generating a decoding code;
second correlating means for obtaining a correlation between the received signal and the decoding code; and
control means for controlling said second generating means in accordance with a code start of the decoding code and a correlation output from said first correlating means when a phase difference between the code start of the decoding code and the correlation output from said first correlating means becomes not less than a predetermined value.

24. An apparatus according to claim 23, wherein said control means controls said second generating means in accordance with code start of the reference code and the correlation output from said first correlating means.

25. An apparatus according to claim 23, wherein said control means initializes said second generating means.

26. An apparatus according to claim 23, wherein the reference code is a time inversion of the decoding code.

27. An apparatus according to claim 23, wherein said correlating means is a convolver.

28. An apparatus according to claim 27, wherein a convolution time of said convolver is one period of the reference code or an integer multiple thereof.

29. A spectrum diffusion communication receiving apparatus comprising:
first correlating means for obtaining a correlation between a received signal and a reference code;
first generating means for generating a decoding code;
second correlating means for obtaining a correlation between the received signal and the decoding code:
second generating means for generating a sync signal synchronized with the decoding code; and
control means for resetting said first generating means when the phase difference between the sync signal generated by said second generating means and a peak of a correlation output from said first correlating means exceeds a predetermined threshold.

30. An apparatus according to claim 29, wherein said decoding means comprises:
second generating means for generating a decoding code; and
second correlating means for obtaining a correlation between the received signal and the decoding code.

31. An apparatus according to claim 29, wherein said second generating means generates a sync signal in synchronism with a start of the decoding code.

32. An apparatus according to claim 29, wherein said first correlating means comprises:

third generating means for generating the reference code.

33. An apparatus according to claim 29, wherein said control means resets said first generating means in accordance with the phase difference between the correlation output from said first correlating means and the sync signal generated by said second generating means.

34. An apparatus according to claim 29, wherein the reference code is a time inversion of the decoding code.

35. An apparatus according to claim 29, wherein said first correlating means is a convolver.

36. An apparatus according to claim 35, wherein a convolution time of said convolver is one period of the reference code or an integer multiple thereof.

37. A spectrum diffusion communication receiving apparatus comprising:

generating means for generating a reference code;

correlating means for obtaining a correlation between a received signal and the reference code from said generating means;

comparing means for comparing phases of the correlation output from said correlating means and the reference code from said generating means; and demodulating means for demodulating the received signal in accordance with a comparison output from said comparing means, wherein said generating means generates the reference code in accordance with a comparison output from said comparing means.

38. An apparatus according to claim 37, wherein said demodulating means demodulates the received signal in accordance with a demodulating code.

39. An apparatus according to claim 38, wherein said demodulating means comprises second generating means for generating a demodulating code form a head bit of the demodulating code in accordance with the comparison output from said comparing means.

40. An apparatus according to claim 38, wherein the demodulating code is determined according to a diffusing code which is used at a transmitting side.

41. An apparatus according to claim 37, wherein said generating means generates the reference code from a head bit of the reference code in accordance with the comparison output from said comparison means.

42. An apparatus according to claim 37, further comprising oscillating means for generating a clock at a frequency in accordance with the comparison output from said comparing means, wherein said generating means generates the reference code in accordance with the clock from said oscillating means.

43. An apparatus according to claim 42, wherein said demodulating means demodulates the received signal in accordance with the clock from said oscillating means.

44. An apparatus according to claim 37, wherein said correlating means comprises a convolver.

45. An apparatus according to claim 44, wherein a convolution time of said convolver is one period of the reference code or an integer multiple thereof.

46. An apparatus according to claim 37, wherein the reference code is a time inversion of a diffusing code which is used at a transmitting side.

* * * * *

UNITED STATES PATENT AND TRADEMARK OFFICE
CERTIFICATE OF CORRECTION

PATENT NO. : 5,260,969
DATED : November 9, 1993
INVENTOR(S) : ICHIRO KATO, ET AL.

It is certified that error appears in the above-identified patent and that said Letters Patent is hereby corrected as shown below:

ON TITLE PAGE

In [57] Abstract, Line 7, "decoding for" should read --decoding unit for--.

SHEET 9 OF 19

FIG. 9, "COUN-OUT" should read --COUNT-OUT--.

SHEET 12 OF 19

FIG. 12, "COUN-OUT" should read --COUNT-OUT--.

SHEET 17 OF 19

FIG. 17, "COUN-OUT" should read --COUNT-OUT--.

COLUMN 2

Line 12, "from" should read --with respect to--.

COLUMN 5

Line 7, "FIG. 2" should read --FIG. 2,--.
Line 32, "FIG. 2" should read --FIG. 2,--.

COLUMN 7

Line 53, "divider 3;" should read --divider 33;--.

UNITED STATES PATENT AND TRADEMARK OFFICE
CERTIFICATE OF CORRECTION

PATENT NO. : 5,260,969
DATED : November 9, 1993
INVENTOR(S) : ICHIRO KATO, ET AL.

It is certified that error appears in the above-identified patent and that said Letters Patent is hereby corrected as shown below:

COLUMN 9

Line 17, "7-position a" should read --7-a-- and "((a)" should read --(position (a)--.
    Line 33, "of FIG. 15)" should read --of FIG. 15),--.

COLUMN 11

Line 43, "if only" should read --only if--.
    Line 58, "envelope," should read --envelope--.

COLUMN 13

Line 59, "1 peak" should read --peak--.

COLUMN 14

Line 35, "the" should be deleted.
    Line 44, "comprises" should read --comprises:--.
    Line 55, "comprises;" should read --comprises:--.

COLUMN 15

Line 50, "and" should read --said--.
    Line 62, "when, the" should read --when the--.

COLUMN 16

Line 48, "code:" should read --code;--.

UNITED STATES PATENT AND TRADEMARK OFFICE
CERTIFICATE OF CORRECTION

PATENT NO. : 5,260,969

DATED : November 9, 1993

INVENTOR(S) : ICHIRO KATO, ET AL.

It is certified that error appears in the above-identified patent and that said Letters Patent is hereby corrected as shown below:

COLUMN 18

Line 6, "form" should read --from--.

Signed and Sealed this

Nineteenth Day of July, 1994

Attest:

BRUCE LEHMAN

Attesting Officer    Commissioner of Patents and Trademarks